United States Patent
Yamada et al.

(10) Patent No.: US 8,731,739 B2
(45) Date of Patent: May 20, 2014

(54) DRIVE SUPPORTING DEVICE

(75) Inventors: Yuki Yamada, Susono (JP); Masato Endo, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 236 days.

(21) Appl. No.: 13/376,963

(22) PCT Filed: Jun. 9, 2009

(86) PCT No.: PCT/JP2009/060522
§ 371 (c)(1),
(2), (4) Date: Feb. 22, 2012

(87) PCT Pub. No.: WO2010/143264
PCT Pub. Date: Dec. 16, 2010

(65) Prior Publication Data
US 2012/0143395 A1  Jun. 7, 2012

(51) Int. Cl.
*G05D 1/00* (2006.01)
*B60W 40/08* (2012.01)
*H04W 4/04* (2009.01)
*G08G 1/0967* (2006.01)

(52) U.S. Cl.
CPC .............. *B60W 40/08* (2013.01); *H04W 4/046* (2013.01); *G08G 1/096725* (2013.01)
USPC .............. 701/1; 701/117; 701/118; 340/439; 340/995.13

(58) Field of Classification Search
CPC . B60W 40/08; H04W 4/046; G08G 1/096725
USPC ........ 701/1, 117, 118, 119, 66; 340/438, 439, 340/995.13, 905
See application file for complete search history.

(56) References Cited

U.S. PATENT DOCUMENTS

| 4,324,153 | A | * | 4/1982 | Sugimoto et al. | 477/70 |
| 6,141,609 | A | * | 10/2000 | Herdeg et al. | 701/521 |
| 6,151,550 | A | * | 11/2000 | Nakatani | 701/117 |

FOREIGN PATENT DOCUMENTS

| JP | 2004 171459 | 6/2004 |
| JP | 2008 051623 | 3/2008 |
| JP | 2008 122196 | 5/2008 |
| JP | 2008 202968 | 9/2008 |
| JP | 2009 042823 | 2/2009 |
| JP | 2009 097944 | 5/2009 |

OTHER PUBLICATIONS

International Search Report Issued Jul. 14, 2009 in PCT/JP09/060522 Filed Jun. 9, 2009.
International Preliminary Report on Patentability Issued Dec. 15, 2011 in PCT/JP09/060522 Filed Jun. 9, 2009.

* cited by examiner

*Primary Examiner* — Gertrude Arthur Jeanglaud
(74) *Attorney, Agent, or Firm* — Oblon, Spivak, McClelland, Maier & Neustadt, L.L.P.

(57) ABSTRACT

A drive supporting device includes a GPS, a front camera, and a communication device that acquire traffic signal information related to the time-series on/off state of a traffic signal and an ECU that supports the driving of a vehicle on the basis of the traffic signal information acquired by, for example, the communication device. The ECU changes a driver support aspect on the basis of the level of proficiency of the driver of the vehicle in a region in which the vehicle is currently located. In this way, even when the driver is in a strange place, it is possible to appropriately support the driving of the vehicle.

14 Claims, 15 Drawing Sheets

DRIVE SUPPORTING DEVICE

TECHNICAL FIELD

The present invention relates to a drive supporting device and more particularly, to a drive supporting device that supports the driving of a vehicle on the basis of traffic signal information related to the time-series on/off state of a traffic signal.

BACKGROUND ART

A device has been proposed which supports the driving of a vehicle on the basis of traffic signal information related to the time-series on/off state of a traffic signal. For example, Patent Literature 1 discloses a system in which a DSRC transmitter that transmits traffic signal information is provided in a traffic signal and an in-vehicle device is provided in the vehicle. The in-vehicle device receives the traffic signal information using a DSRC receiver. The in-vehicle device calculates the on/off state of the traffic signal and the change timing thereof from the received information and displays the calculation result on a display device. The driver can recognize time until the on/off state of the traffic signal changes and drive the vehicle.

CITATION LIST

Patent Literature

[Patent Literature 1] Japanese Unexamined Patent Application Publication No. 2004-171459

SUMMARY OF INVENTION

Technical Problem

However, in the above-mentioned technique, a signal cycle indicating a periodic change in the on/off state of the traffic signal varies depending on the country or region. When the driver drives the vehicle in a strange place and the same method is used to provide the traffic signal information or information using the traffic signal, the driver is likely to analyze the information in the same way as that used in a familiar place and misunderstand the provided information.

For example, when the above-mentioned system is used to support the driving of the driver who is not from Japan and is unfamiliar with a traffic signal system in Japan, the driver is likely to misunderstand the provided information and the intention of the system is not successfully transmitted to the driver. In the case of the driver who is unfamiliar with the traffic signal system in Japan, even though the driver is a drive support target of the drive supporting device, drive support may not be performed. For example, red light intrusion notification is not performed for the driver who is likely to intrude into an intersection on a red light.

This is because a signal system and traffic policy vary depending on the country. For example, the driver who is not from Japan and is unfamiliar with a Japanese traffic signal system acts in the same way as that in the traffic signal system of the driver's own country. The above-mentioned drive supporting device is designed on condition that the driver is familiar with the traffic signal system of the country. When the drive supporting device predicts the action of the driver, the traffic signal system of the country of the driver is not considered.

This is an international society and there are many opportunities to drive vehicles in other countries. Against this background, the above-mentioned device according to the related art is designed on condition that the driver drives the vehicle in the driver's own country or region. Therefore, there is a concern that the driver who is not familiar with the traffic signal system of the country cannot appropriately use the drive support function of the drive supporting device.

This problem needs to be solved when a device that supports the driving of the vehicle on the basis of the traffic signal information is developed. In particular, the problem is very important in the USA in which states have different laws and the same state has local rules. In addition, since drivers can drive vehicles between countries in the EU, the problem is very important.

The invention has been made in view of the above-mentioned problem and an object of the invention is to provide a drive supporting device capable of appropriately performing drive support for the driver when though the driver is in a strange place.

Solution to Problem

According to the invention, a drive supporting device includes an information acquiring unit that acquires traffic signal information related to a time-series on/off state of a traffic signal and a drive support unit that supports the driving of a vehicle on the basis of the traffic signal information acquired by the information acquiring unit. The drive support unit changes a drive support aspect on the basis of the level of proficiency of a driver of the vehicle in a region in which the vehicle is currently located.

According to this structure, in the drive supporting device including the information acquiring unit that acquires the traffic signal information related to the time-series on/off state of the traffic signal and the drive support unit that supports the driving of the vehicle on the basis of the traffic signal information acquired by the information acquiring unit, the drive support unit changes the drive support aspect on the basis of the level of proficiency of the driver of the vehicle in the region in which the vehicle is currently located. Therefore, it is possible to appropriately perform drive support for the driver even when the driver is in a strange place.

In this case, the drive support unit may change an aspect of providing the driver with provision information which is created on the basis of the traffic signal information acquired by the information acquiring unit, on the basis of the level of proficiency of the driver of the vehicle in the region in which the vehicle is currently located.

According to this structure, the drive support unit changes the aspect of providing the driver with provision information which is created on the basis of the traffic signal information acquired by the information acquiring unit, on the basis of the level of proficiency of the driver of the vehicle in the region in which the vehicle is currently located. Therefore, it is possible to prevent the driver from misunderstanding the provided information even when the driver is in a strange place.

In this case, the drive support unit may change the aspect of providing the provision information to the driver, on the basis of a difference between the traffic signal information in the region in which the vehicle is currently located and the traffic signal information in a region in which the level of proficiency of the driver of the vehicle is higher than that in the region in which the vehicle is currently located.

According to this structure, the drive support unit changes the aspect of providing the provision information to the driver, on the basis of the difference between the traffic signal information in the region in which the vehicle is currently located and the traffic signal information in a region in which the level of proficiency of the driver of the vehicle is higher than that in the region in which the vehicle is currently located. Therefore, even when the driver is in a strange place and misunderstands that the traffic signal system is the same as that in a familiar place, it is possible to effectively prevent the misunderstanding of the provided information.

The drive support unit may change the aspect of providing the provision information to the driver, on the basis of a difference between the rules of driving for the on/off state of the traffic signal in the region in which the vehicle is currently located and the rules of driving for the on/off state of the traffic signal in the region in which the level of proficiency of the driver of the vehicle is higher than that in the region in which the vehicle is currently located.

According to this structure, the drive support unit changes the aspect of providing the provision information to the driver, on the basis of the difference between the rules of driving for the on/off state of the traffic signal in the region in which the vehicle is currently located and the rules of driving for the on/off state of the traffic signal in the region in which the level of proficiency of the driver of the vehicle is higher than that in the region in which the vehicle is currently located. Therefore, even when the driver is in a strange place and misunderstands that the rules of driving for signals are the same as that in a familiar place, it is possible to effectively prevent the misunderstanding of the provided information.

The drive support unit may change the aspect of providing the provision information to the driver, on the basis of a direction indicated by an arrow light and a direction in which the vehicle travels.

According to this structure, when there is an arrow light, it is possible to effectively prevent the misunderstanding of the provided information even when the driver is in a strange place and misunderstands that the traffic signal system of the arrow light is the same as that in a familiar place.

The drive support unit may control the traveling of the vehicle on the basis of the traffic signal information acquired by the information acquiring unit, and change an aspect of controlling the traveling of the vehicle on the basis of the level of proficiency of the driver of the vehicle in the region in which the vehicle is currently located.

According to this structure, the drive support unit controls the traveling of the vehicle on the basis of the traffic signal information acquired by the information acquiring unit, and changes an aspect of controlling the traveling of the vehicle on the basis of the level of proficiency of the driver of the vehicle in the region in which the vehicle is currently located. Therefore, even when the driver is in a strange place, it is possible to perform drive support by controlling the traveling of the vehicle, considering that the driver is in a strange place.

In this case, the drive support unit may change a control target range of the traveling of the vehicle on the basis of the level of proficiency of the driver of the vehicle in the region in which the vehicle is currently located.

According to this structure, the drive support unit changes the control target range of the traveling of the vehicle on the basis of the level of proficiency of the driver of the vehicle in the region in which the vehicle is currently located. Therefore, even when the driver is in a strange place, it is possible to appropriately perform drive support by controlling the traveling of the vehicle in the control range considering that the driver is in a strange place.

The drive support unit may change the control timing of the traveling of the vehicle on the basis of the level of proficiency of the driver of the vehicle in the region in which the vehicle is currently located.

According to this structure, the drive support unit changes the control timing of the traveling of the vehicle on the basis of the level of proficiency of the driver of the vehicle in the region in which the vehicle is currently located. Therefore, even when the driver is in a strange place, it is possible to appropriately perform drive support by controlling the traveling of the vehicle at the control timing considering that the driver is in a strange place.

The drive supporting device according to the invention may further include a proficiency level determining unit that determines the level of proficiency of the driver of the vehicle in the region in which the vehicle is currently located. The proficiency level determining unit may determine the level of proficiency of the driver of the vehicle in the region in which the vehicle is currently located on the basis of the nationality of the driver of the vehicle.

According to this structure, the proficiency level determining unit determines the level of proficiency of the driver of the vehicle in the region in which the vehicle is currently located on the basis of the nationality of the driver of the vehicle. Therefore, it is possible to simply and reliably determine the level of proficiency of the driver of the vehicle in the region in which the vehicle is currently located.

In this case, the proficiency level determining unit may determine the level of proficiency of the driver of the vehicle in the region in which the vehicle is currently located, on the basis of at least one of a driving time and a driving distance at a previous address of the driver and at least one of a driving time and a driving distance in the region in which the vehicle is currently located.

According to this structure, the proficiency level determining unit determines the level of proficiency of the driver of the vehicle in the region in which the vehicle is currently located, on the basis of at least one of the driving time and the driving distance at a previous address of the driver and at least one of the driving time and the driving distance in the region in which the vehicle is currently located. Therefore, it is possible to accurately determine the level of proficiency of the driver of the vehicle in the region in which the vehicle is currently located.

Advantageous Effects of Invention

According to the drive supporting device of the invention, even when the driver is in a strange place, it is possible to appropriately perform drive support for the driver.

DESCRIPTION OF EMBODIMENTS

Hereinafter, drive supporting devices according to the exemplary embodiments of the invention will be described with reference to the accompanying drawings.

Figure 1:
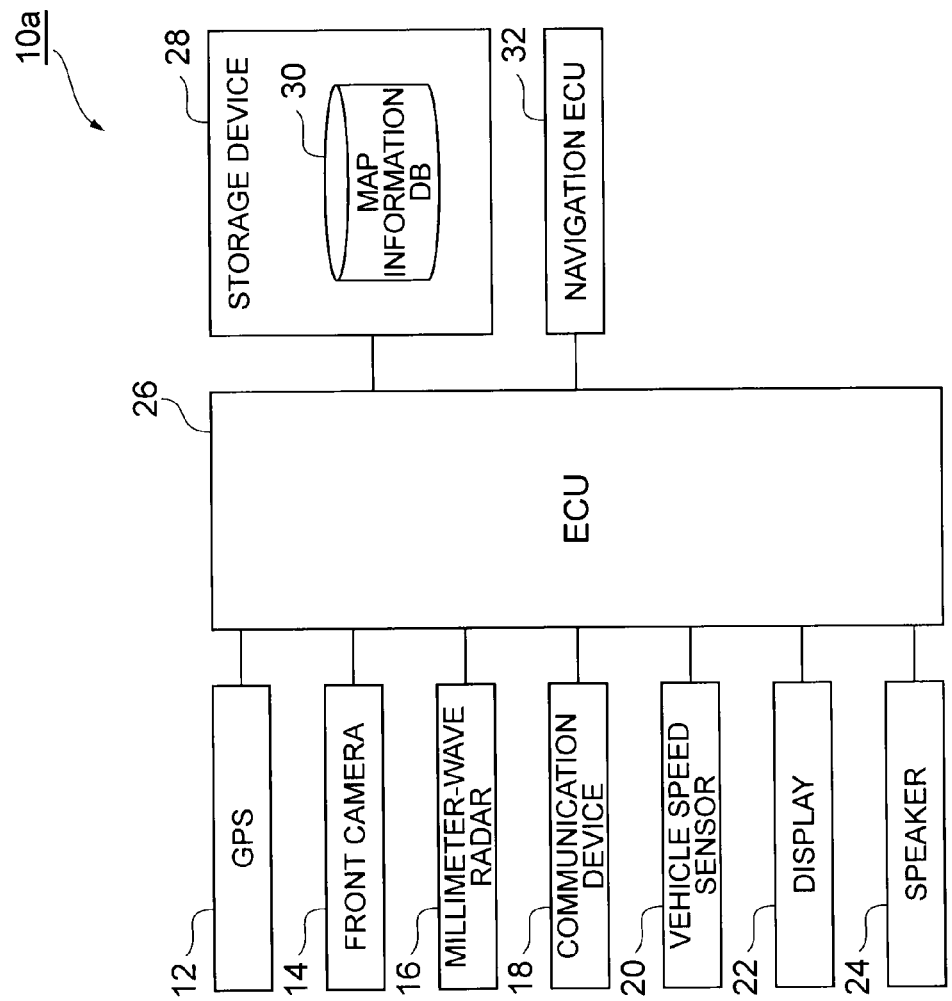
FIG. 1 is a block diagram illustrating the structure of a drive supporting device according to a first embodiment.

Hereinafter, the exemplary embodiments of the drive supporting device according to the invention will be described with reference to the drawings. As shown in FIG. 1, a drive supporting device 10a according to a first embodiment is formed by connecting a GPS 12, a front camera 14, a millimeter-wave radar 16, a communication device 18, a vehicle speed sensor 20, a display 22, a speaker 24, a storage device (HDD) 28, and a navigation ECU 32 to an ECU 26. The drive supporting device 10a according to this embodiment performs drive support in cooperation with traffic signal information related to the time-series on/off state of a traffic signal which is received from a road-side facility, such as an optical beacon, by the communication device 16 and navigation information of the GPS 12 and the storage device 28.

The GPS (Global Positioning System) 12 receives signals from a plurality of GPS satellites using a GPS receiver and measures the position of a host vehicle from the difference between the signals.

The front camera 14 is used to capture the image of a vehicle in front of the host vehicle and obtain the speed (including a relative speed) and deceleration of the vehicle in front, the distance between the host vehicle and the vehicle in front, and the time between the host vehicle and the vehicle in front.

The millimeter-wave radar 16 is used to obtain the speed (including a relative speed) and deceleration of the vehicle in front of the host vehicle, the distance between the host vehicle and the vehicle in front, and the time between the host vehicle and the vehicle in front. The radar 16 is a sensor that emits electromagnetic waves, such as millimeter waves, to the front side, receives waves reflected from an object, and detects the speed and deceleration of the vehicle in front, the inter-vehicle distance, and the inter-vehicle time.

Specifically, the communication device 18 is an optical beacon receiver or a vehicle-to-vehicle communication device and is for acquiring the traffic signal information related to the time-series on/off state of the traffic signal which is transmitted from the optical beacon transmitter of the road-side facility or other vehicles.

The vehicle speed sensor 20 detects the rotation speed of an axle to detect the speed of the host vehicle.

The display 22 displays a screen to provide the driver with, for example, information indicating the intrusion of the host vehicle to the intersection where the red light turns on. The speaker 24 outputs a voice to provide the driver with, for example, information indicating the intrusion of the host vehicle to the intersection where the red light turns on.

The ECU 26 is for creating information to be output from the display 20 or the speaker 24 in order to perform drive support for the vehicle, on the basis of the traffic signal information acquired by the GPS 12, the front camera 14, and the communication device 16.

The storage device (HDD: hard disk drive) 28 includes a map information DB 30 having map information stored therein and is used by the ECU 26 to acquire the positional information of the host vehicle obtained by the GPS 12 and information related to, for example, the route through which the host vehicle travels and a travel distance. Alternatively, the storage device 28 stores, for example, time-series traffic signal information related to the previous on/off state of the traffic signal at each position or a driving history. In addition, the storage device 28 stores a traffic signal information table of all the countries of the world.

The navigation ECU 32 creates information for guiding the route of the host vehicle driven by a navigation system on the basis of the positional information of the host vehicle obtained by the GPS 12 and the map information DB 30 of the storage device 28 and outputs the information for route guidance from the display 20 or the speaker 24.

In the structure of the drive supporting device 10a, the front camera 14, the communication device 16, and the navigation ECU 32 may be omitted. In addition, the navigation ECU 32 may be included in the ECU 26.

Next, the operation of the drive supporting device 10a according to this embodiment will be described. When the user of the country in which a yellow light turning-on time Ty is longer than that in Japan receives a red light intrusion notification on the yellow light, the user is likely to misunderstand that the driver can pass through the intersection, even though the light is red. In addition, when the user of the country in which the yellow light turning-on time Ty is shorter than that in Japan receives the red light intrusion notification on the yellow light, the user is likely to misunderstand that the driver needs to stop at the intersection, even though the light is yellow. Therefore, in this embodiment, the yellow light turning-on time for which red light intrusion notification is performed is changed considering the standard yellow light turning-on time of the country with which the driver is familiar.

Figure 2:
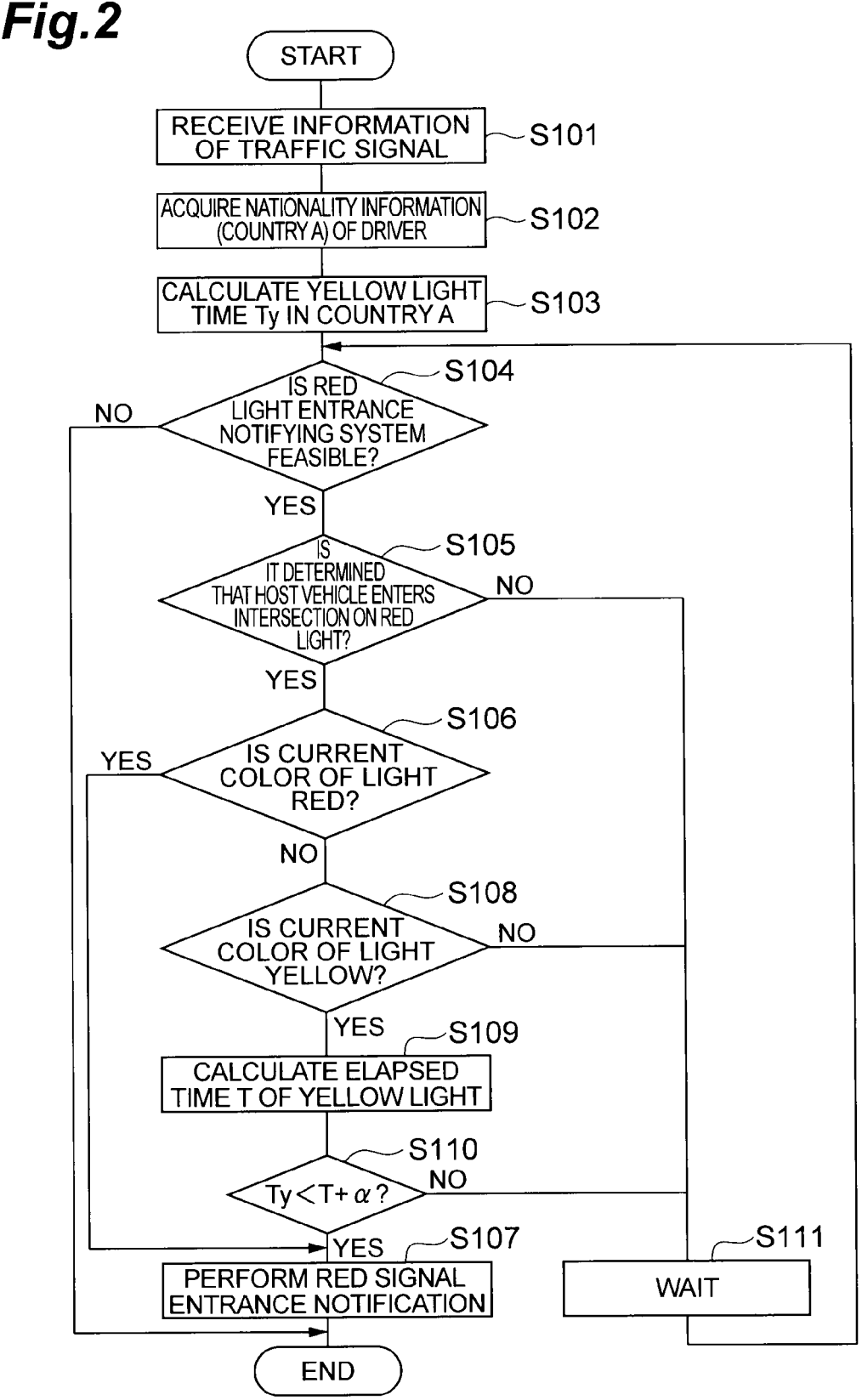
FIG. 2 is a flowchart diagram illustrating the operation of the drive supporting device according to the first embodiment.

As shown in FIG. 2, the ECU 26 receives the traffic signal information of the traffic signal at the intersection through which the host vehicle passes from the information received by the communication device 20 from a road-side facility, such as an optical beacon, or other vehicles, the signal turning-on history of the traffic signal included in the storage device 28, and the image captured by the front camera 14 (S101).

The ECU 26 acquires the nationality information of the driver, such as information indicating that the driver of the host vehicle is from a country A (S102). In this case, the nationality information of the driver may be acquired by registering the individual information of the driver in the storage device 28 in advance. In addition, the ECU 26 may estimate the nationality of the driver on the basis of the driving history stored in the storage device 28 or the settings of the navigation system by the driver, thereby acquiring the nationality information of the driver.

As described above, the ECU 26 determines the level of proficiency of the driver of the vehicle in a region in which the vehicle is currently positioned on the basis of the nationality of the driver. In addition, the ECU 26 may compare the driving time and driving distance of the driver at the previous address with the driving time and driving distance of the driver in the region in which the vehicle is currently positioned and determine the level of proficiency of the driver of the vehicle in the region in which the vehicle is currently positioned on the basis of the proportion of the driving times and the driving distances at the two positions.

The ECU 26 calculates the yellow light time Ty in the country A from which the driver comes (S103). The ECU 26 may calculate the yellow light time Ty in the country A with reference to the traffic signal information table of all the countries of the world stored in the storage device 28. Alternatively, the ECU 26 may receive the traffic signal information of all the countries of the world from the communication device 18 or a predetermined probe and calculate the yellow light time Ty in the country A.

ECU 26 determines whether a red light intrusion notifying system is feasible on the basis of the traffic signal information acquired in Step S101 (S104). For example, when the host vehicle does not enter the service area of the road-side facility, when the red light turning-on time is short, and when it is difficult to specify the signal turning-on time of the traffic signal, the ECU 26 determines that the red light intrusion notifying system is not feasible and does not perform the next step.

The ECU 26 determines whether the host vehicle intrudes into the intersection where a target traffic signal is installed on a red light (S105). The ECU 26 may determine whether the host vehicle intrudes into the intersection on the red light, on the basis of, for example, traffic signal information including a signal cycle, the position of the host vehicle, the speed of the host vehicle, the deceleration of the host vehicle, the active state of the host vehicle, and the distance of the traffic signal to a stop line.

When it is determined that the host vehicle intrudes into the intersection on the red light (S105), the ECU 26 calculates the color of the signal light which is currently being turned on (S106). When a red light comes on (S106), the ECU 26 performs red light intrusion notification and notifies the driver that, if the host vehicle travels without stopping, it intrudes into the intersection on the red light, using the display 22 and the speaker 24 (S107).

When a yellow light comes on (S108), the ECU 26 calculates a time T elapsed from the start of the turning-on of the yellow light (S109). When $Ty<T+\alpha$ is satisfied, the ECU 26 performs the red light intrusion notification (S110) (where $\alpha$ is a fixed value determined by evaluation experiments and $T+\alpha$ is a time when the driver from the country A actually considers that the turning-on of the yellow light ends). The fixed value $\alpha$ for correction may be calculated by, for example, the time of the behavior of the driver from the country A in the evaluation experiment. In this case, for example, when the host vehicle is disposed in Japan and the driver is from Japan, the fixed value $\alpha$ does not need to be corrected and is 0.

When $Ty \geq T+\alpha$ is satisfied, the ECU 26 does not perform the red light intrusion notification and waits (S111). When it is determined that the host vehicle does not intrudes into the intersection on the red light (S105), the ECU 26 does not perform the red light intrusion notification and waits (S111). When the red light does not come on (S106) and the yellow light does not come on (S108), that is, when the green light comes on, the ECU 26 does not perform the red light intrusion notification and waits (S111).

When service end conditions are established, the ECU 26 ends the service. The service end conditions include, for example, a case in which the red light intrusion notification is performed once, a case in which the host vehicle gets out of the service area, and a case in which the red light time ends.

In this embodiment, in the drive supporting device 10a including the GPS 12, the front camera 14, and the communication device 18 that acquire the traffic signal information related to the time-series on/off state of the traffic signal, and the ECU 28 that performs drive support for the vehicle on the basis of the traffic signal information acquired by, for example, the communication device 18, the ECU 28 changes the aspect of drive support on the basis of the level of proficiency of the driver of the vehicle in the region in which the vehicle is currently located. Therefore, even when the driver is in a strange place, it is possible to appropriately support the driving of the driver.

In this embodiment, the ECU 28 changes the aspect that provides the driver with provision information created on the basis of the traffic signal information acquired by, for example, the communication device 18 on the basis of the level of proficiency of the driver of the vehicle in the region in which the vehicle is currently located. Therefore, even when the driver is in a strange place, it is possible to prevent the driver from misunderstanding the provided information.

In this embodiment, the ECU 28 changes the aspect that provides the provision information to the driver on the basis of the difference between the traffic signal information in the region in which the vehicle is currently located and traffic signal information in a region in which the level of proficiency of the driver of the vehicle is higher than that in the region in which the vehicle is currently located. Therefore, even when the driver is in a strange place and the driver is likely to analyze that a traffic signal system is the same as that in a familiar place, it is possible to effectively prevent the driver from misunderstanding the provided information.

That is, in this embodiment, it is determined whether to notify red light intrusion on the basis of the yellow light turning-on time Ty in the country A with which the driver is familiar and the time $T+\alpha$ when the driver from the country A actually considers that the turning-on time of the yellow light ends. That is, in this embodiment, the remaining turning-on time of the yellow light for which red light intrusion is notified is changed considering the standard yellow light turning-on time in the country with which the driver is familiar.

In this way, when the driver from the country in which the yellow light turning-on time Ty is longer than that in Japan receives the red light intrusion notification on the yellow light, it is possible to prevent the driver from misunderstanding that the driver can pass through the intersection. When the driver from the country in which the yellow light turning-on time Ty is shorter than that in Japan receives the red light intrusion notification on the yellow light, it is possible to prevent the driver from misunderstanding that the driver needs to stop even though the light is yellow.

In this embodiment, the ECU 26 determines the level of proficiency of the driver of the vehicle in the region in which the vehicle is currently located on the basis of the nationality of the driver of the vehicle. Therefore, it is possible to simply and reliably determine the level of proficiency of the driver of the vehicle in the region in which the vehicle is currently located. In particular, in this embodiment, the ECU 26 determines the level of proficiency of the driver of the vehicle in the region in which the vehicle is currently located on the basis of at least one of the driving time and the driving distance at the previous address of the driver and at least one of the driving time and the driving distance in the region in which the vehicle is currently located. Therefore, it is possible to accurately determine the level of proficiency of the driver of the vehicle in the region in which the vehicle is currently located.

Figure 3:
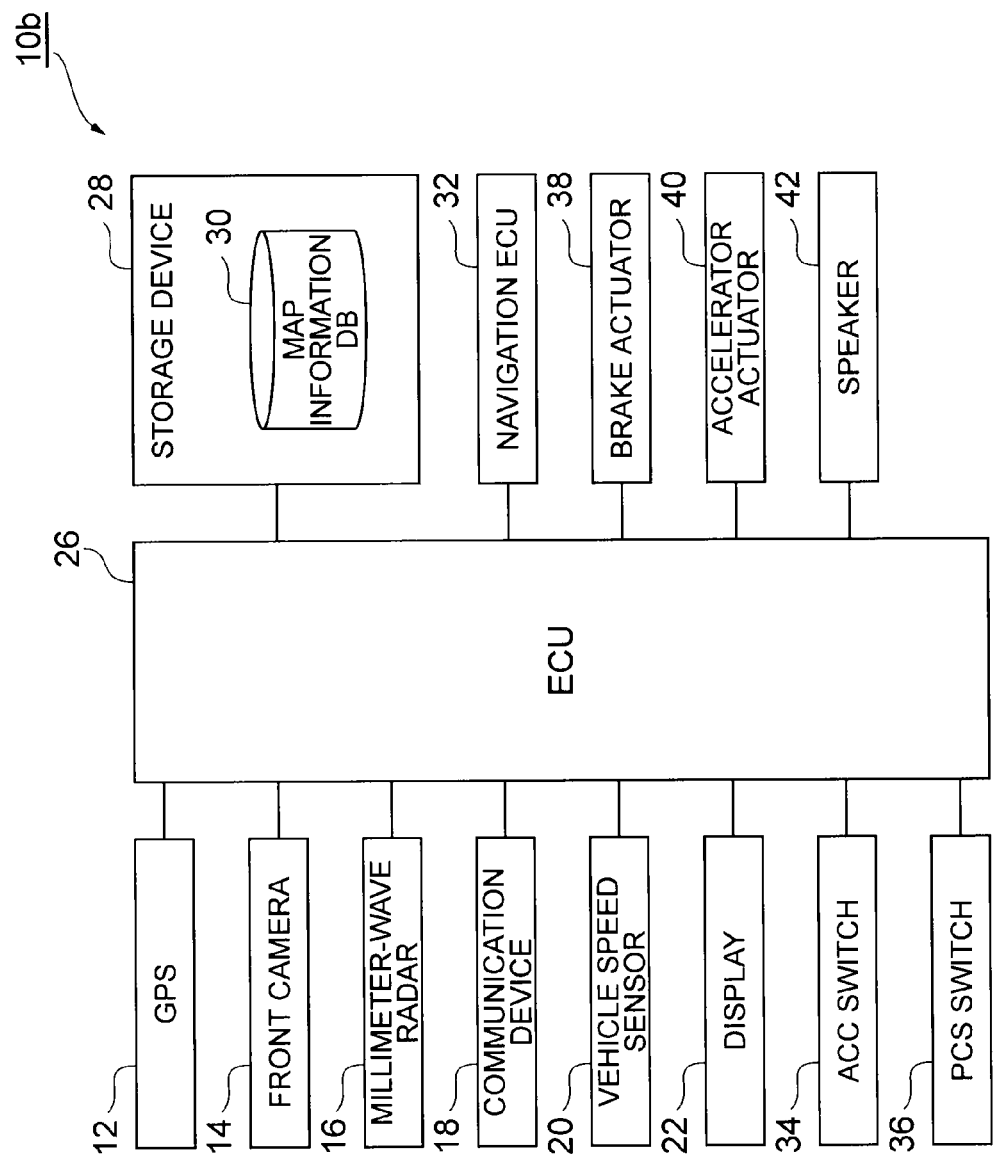
FIG. 3 is a block diagram illustrating the structure of a drive supporting device according to a second embodiment.

Next, a second embodiment of the invention will be described. As shown in FIG. 3, a drive supporting device 10b according to this embodiment includes an ACC switch 34, a PCS switch 36, a brake actuator 38, and an accelerator actuator 40, in addition to the structure of the drive supporting device 10a according to the first embodiment.

The ACC (Adaptive Cruise Control) switch is a switch for performing ACC control to make the host vehicle travel according to a set vehicle speed or a set distance (inter-vehicle time) between the host vehicle and a vehicle in front of the host vehicle.

The PCS (Pre-Crash Safety) switch is a switch for performing PCS control to avoid the collision between the host vehicle and other vehicles or reduce damage when the host vehicle collides with other vehicles.

The brake actuator 38 drives a wheel cylinder of each wheel with the pressure of brake oil on the basis of a command signal from the ECU 26 to give braking force to the host vehicle.

The accelerator actuator 40 is an actuator that adjusts the degree of opening of a throttle valve. The accelerator actuator 40 is operated to adjust the degree of opening of the throttle valve in response to a target throttle opening level signal from the ECU 26.

Next, the operation of the drive supporting device 10b according to this embodiment will be described. In this embodiment, red light intrusion notification timing, an inter-vehicle distance in ACC control, the amount of brake assist, the operation range of PCS control, and the tension of a seat belt are changed considering the standard yellow light turning-on time in the country with which the driver is familiar.

Figure 4:
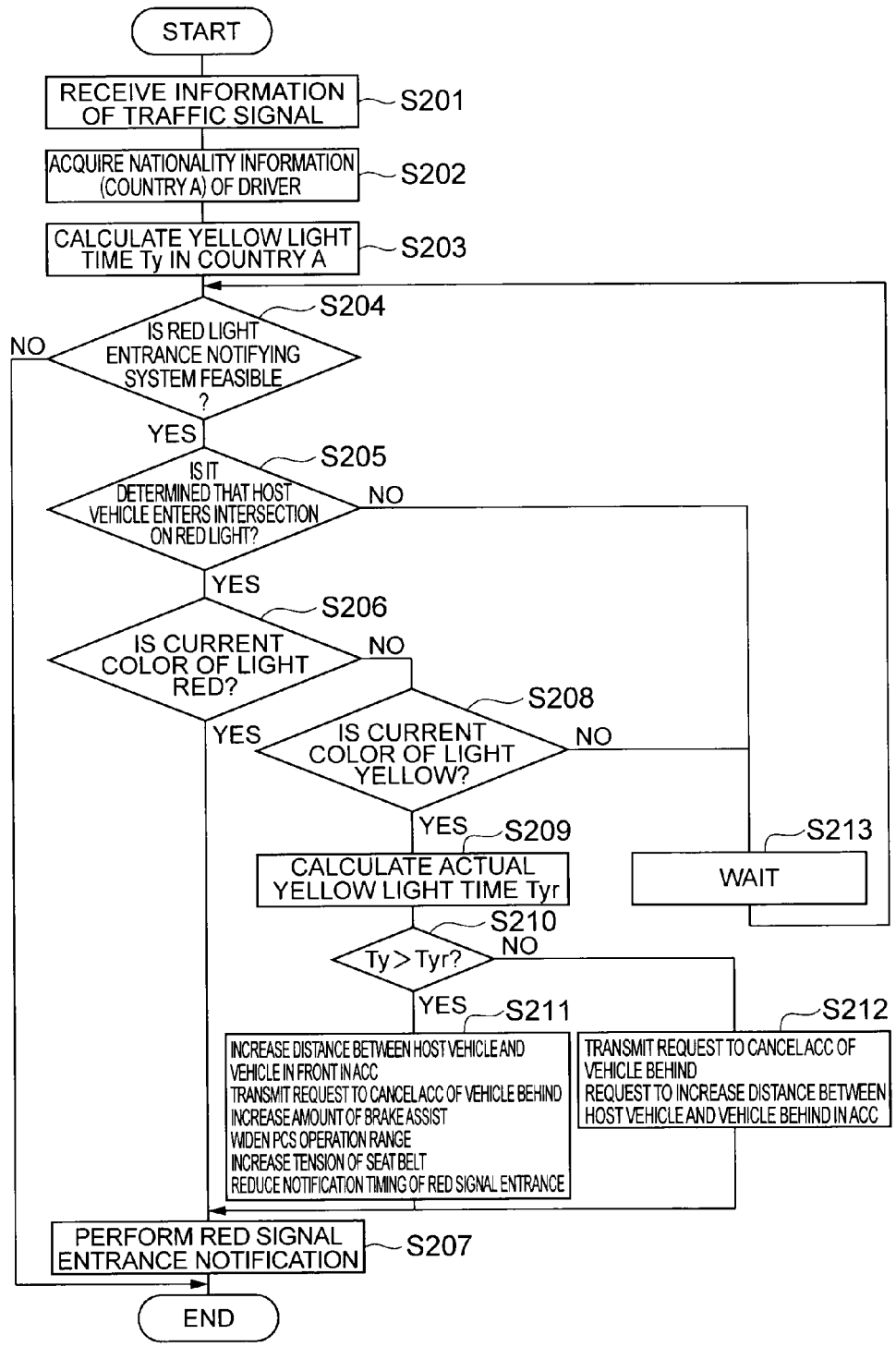
FIG. 4 is a flowchart diagram illustrating the operation of the drive supporting device according to the second embodiment.

As shown in FIG. 4, the ECU 26 performs the same Steps S201 to S208 as Steps S101 to S108 in the first embodiment. When the yellow light comes on (S208), the ECU 26 calculates a yellow light time Tyr from the start of the actual turning-on of the yellow light to the end of the turning-on of the yellow light (S209).

The ECU 26 compares the yellow light turning-on time Ty in the country A with the actual yellow light turning-on time Tyr (S210). When Ty>Tyr is satisfied, that is, when the yellow light turning-on time Ty with which the driver from the country A is familiar is longer than the actual yellow light turning-on time Tyr, the driver is likely to misunderstand that the yellow light is maintained in an on state. As a result, the driver is likely to suddenly increase the speed or suddenly stop the vehicle since the turning-on time of the yellow light is shorter than the time that the driver expects.

When Ty>Tyr is satisfied, the ECU 26 increases the distance between the host vehicle and the vehicle in front of the host vehicle in ACC control. The ECU 26 transmits a request to cancel ACC control for automatically following the host vehicle to a vehicle behind the host vehicle using the communication device 18. The ECU 26 increases the amount of brake assist. The ECU 26 increases the operation range of PCS control. The ECU 26 increases the tension of the seat belt. The ECU 26 reduces the red light intrusion notification timing (S211).

When Ty≤Tyr is satisfied, that is, when the yellow light turning-on time Ty with which the driver from the country A is familiar is equal to or less than the actual yellow light turning-on time Tyr, the driver is likely to misunderstand that the yellow light turning-on time is shorter than the actual one. As a result, the driver is likely to unnecessarily increase or decrease the speed in order to respond to the turning-on time of the yellow light that is expected to be shorter than the actual one.

When Ty≤Tyr is satisfied, the ECU 26 transmits a request to cancel ACC control for automatically following the host vehicle to the vehicle behind the host vehicle using the communication device 18. Alternatively, the ECU 26 requests the vehicle behind the host vehicle to increase the inter-vehicle distance in the ACC control for automatically following the host vehicle using the communication device 18 (S212).

When the red light does not come on (S206) and the yellow light does not come on (S208), that is, when the green light comes on, the ECU 26 does not perform the red light intrusion notification and waits (S213).

In this embodiment, the ECU 26 performs ACC control or PCS control on the traveling of the vehicle on the basis the traffic signal information acquired by, for example, the communication device 18 and changes the aspect of the traveling control of the vehicle on the basis of the level of proficiency of the driver of the vehicle in the region in which the vehicle is currently located. Therefore, even when the driver is in a strange place, it is possible to perform drive support by controlling the traveling of the vehicle considering that the driver is in the strange place.

In this embodiment, the ECU 26 changes the range of control for the traveling of the vehicle, for example, the operation range of PCS control, on the basis of the level of proficiency of the driver of the vehicle in the region in which the vehicle is currently located. Therefore, even when the driver is in a strange place, it is possible to appropriately perform drive support by controlling the traveling of the vehicle in the control range considering that the driver is in the strange place.

In this embodiment, the ECU 26 changes the traveling control timing of the vehicle, for example, the operation range of PCS control on the basis of the level of proficiency of the driver of the vehicle in the region in which the vehicle is currently located, thereby changing operation timing. Therefore, even when the driver is in a strange place, it is possible to appropriately perform drive support by controlling the traveling of the vehicle at the control timing considering that the driver is in the strange place.

Next, a third embodiment of the invention will be described. When the driver from the country in which there is no time (hereinafter, referred to as all-red time) when all signal lights on the roads at the intersection are red, for example, the USA drives the vehicle in the country in which there is the all-red time, the driver from the USA is likely to misunderstand that the front signal light will be changed to green at the time when the signal lights are red at the intersection. On the contrary, when the driver from the country in which there is the all-red time drives the vehicle in the country in which there is no all-red time, the driver is likely to misunderstand that the front signal light has not been changed even though the signal light is red at the intersection. Therefore, in this embodiment, a condition for ending the red light entrance notification is changed considering whether there is the all-red time in the country with which the driver is familiar.

Figure 5:
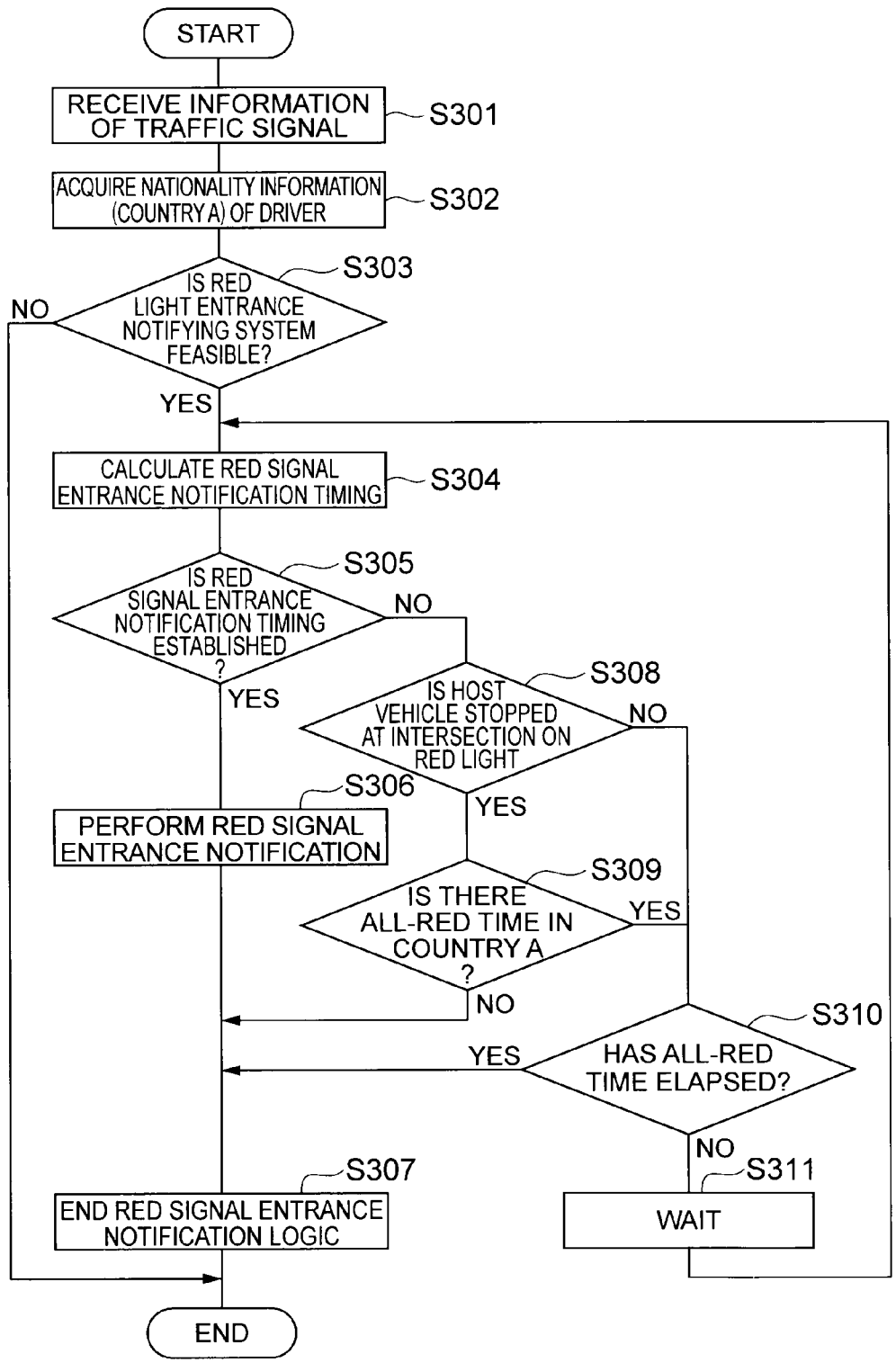
FIG. 5 is a flowchart diagram illustrating the operation of a drive supporting device according to a third embodiment.

In this embodiment, the drive supporting device 10a shown in FIG. 1 may be applied. As shown in FIG. 5, similarly to the first embodiment, the ECU 26 receives the traffic signal information of the traffic signal at the intersection through which the host vehicle passes (S301). Similarly to the first embodiment, the ECU 26 acquires the nationality information of the driver, such as information indicating that the driver of the host vehicle is from a country A (S302). Similarly to the first embodiment, the ECU 26 determines whether a red light intrusion notifying system is feasible (S303).

The ECU 26 starts the calculation of red light entrance notification timing (S304). Similarly to the first embodiment, the ECU 26 determines whether the host vehicle intrudes into the intersection where a target traffic signal is installed on a red light (S305).

When it is determined that the host vehicle intrudes into the intersection on the red light (S305), the ECU 26 performs red light intrusion notification to notify the driver that, when the host vehicle travels without stopping, it intrudes into the intersection on the red light, using the display 22 and the speaker 24 (S306). Then, when the same service end condition as that in the first embodiment is satisfied, the ECU 26 ends a red light entrance notification logic (S307).

When it is determined that the host vehicle does not intrude into the intersection on the red light (S306), the ECU 26 determines whether the host vehicle is stopped at the intersection on the red light (S308). When the host vehicle is stopped (S308), the ECU 26 determines whether there is the all-red time in the country A (S309). The ECU 26 may determine whether there is the all-red time in the country A with reference to the traffic signal information table of all the countries of the world stored in the storage device 28. Alternatively, the ECU 26 may receive the traffic signal information of all the countries of the world from the communication device 18 or a predetermined probe and determine whether there is the all-red time in the country A.

When there is no all-red time in the country A (S309), the ECU 26 waits (S311) until the all-red time of the traffic signals at the intersection ends (S310). After the all-red time of the traffic signals at the intersection ends (S310), the red light entrance notification logic ends (S307). On the other hand, when there is the all-red time in the country A (S309) and the same service end condition as that in the first embodiment is satisfied, the ECU 26 ends the red light entrance notification logic (S307).

When the host vehicle is not stopped at the intersection on the red light (S308), the ECU 26 waits (S311) until the all-red time of the traffic signals at the intersection ends (S310). After the all-red time of the traffic signals at the intersection ends (S310), the red light entrance notification logic ends (S307).

In this embodiment, when the driver from the country in which there is no all-red time, such as USA, drives the vehicle in the country in which there is the all-red time, the red light entrance notification logic does not end until the all-red time ends even though the vehicle is stopped. Therefore, it is possible to prevent the vehicle from entering the intersection for the all-red time.

When the driver from the country in which there is the all-red time drives the vehicle in the country in which there is no all-red time, it is preferable that the ECU 26 operate the logic of the system for preventing a delay in acceleration at the time when the red light turns off and notify information for prompting acceleration to the driver using the display 22 or the speaker 24. In this way, the driver from the country in which there is the all-red time drives the vehicle in the country in which there is no all-red time, it is possible to prevent a delay in acceleration on a green light due to misunderstanding that the front signal light has not been changed even though the light is red at the intersection.

In the case in which the driver from the country in which there is no all-red time drives the vehicle in the country in which there is the all-red time, when the driver turns right, the driver is likely to misunderstand that there is no all-red time and forcibly turn right. Therefore, when the driver from the country in which there is no all-red time drives the vehicle in the country in which there is the all-red time, it is preferable that the ECU 26 instruct the navigation ECU 32 to set a right turn at the intersection with an arrow light in route guidance or to set a route in which the number of right turns is as small as possible at the intersection.

Figure 7:
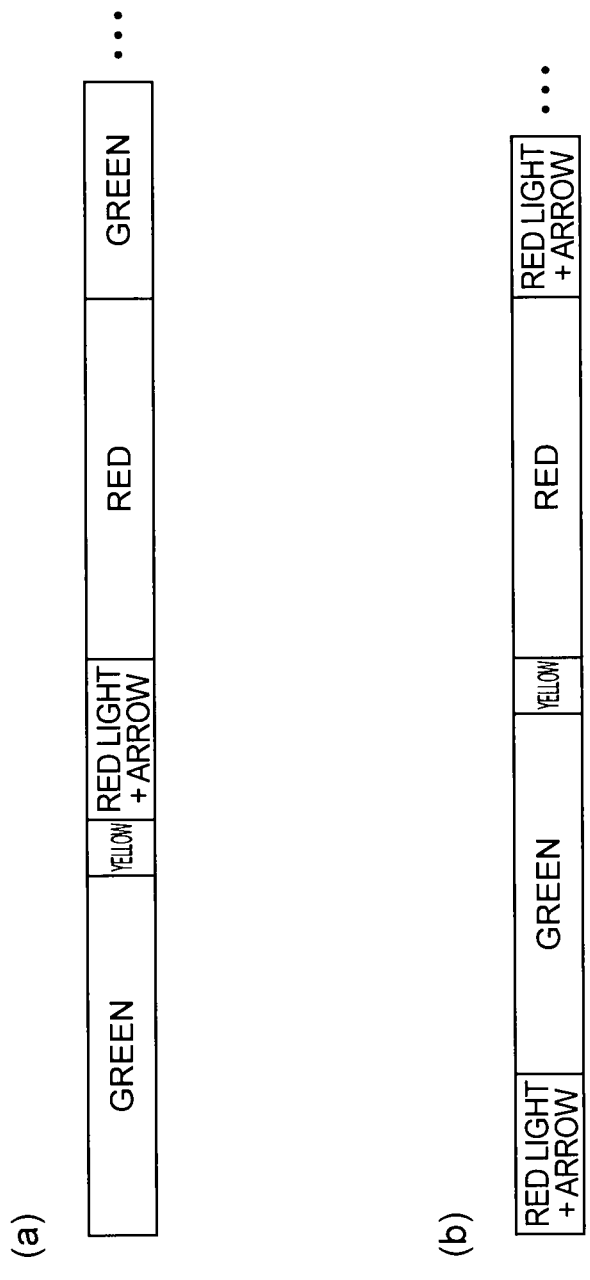
FIGS. 7(a) and 7(b) are diagrams illustrating signal cycles indicating different turning-on timings of an arrow light.

Next, a fourth embodiment will be described. As shown in FIG. 7(a), in the case in which the driver from the country in which the arrow light comes on, followed by the green light, as shown in FIG. 7(b), for example, the USA drives the vehicle in the country in which the arrow light comes on, followed by the red light, as shown in FIG. 7(a), for example, Japan, the driver is likely to misunderstand that the arrow light comes on when the turning-on of the red light ends.

As a result, in the case in which the driver from the country in which the arrow light comes on, followed by the green light, drives the vehicle in the directions other than the direction of the arrow light, when the turning-on of the red light ends, the driver is likely to misunderstand that the arrow light comes on even though the green light comes on after the red light in practice and a delay in acceleration is likely to occur. In the case in which the driver from the country in which the arrow light comes on, followed by the green light, drives the vehicle in the direction of the arrow light, when the turning-on of the red light ends, the driver is likely to misunderstand that the arrow light comes on even though the green light comes on after the red light in practice and the driver needs to check oncoming vehicles. As a result, the driver is likely to enter the intersection without sufficiently checking the surroundings. On the contrary, the same holds for the case in which the driver from the country in which the arrow light comes on, followed by the red light, drives the vehicle in the country in which the arrow light comes on, followed by the green light.

In this embodiment, the end condition of red light entrance notification or the execution condition of an acceleration delay prevention system is changed considering the signal cycle of a traffic signal with an arrow light with which the driver is familiar.

Figure 6:
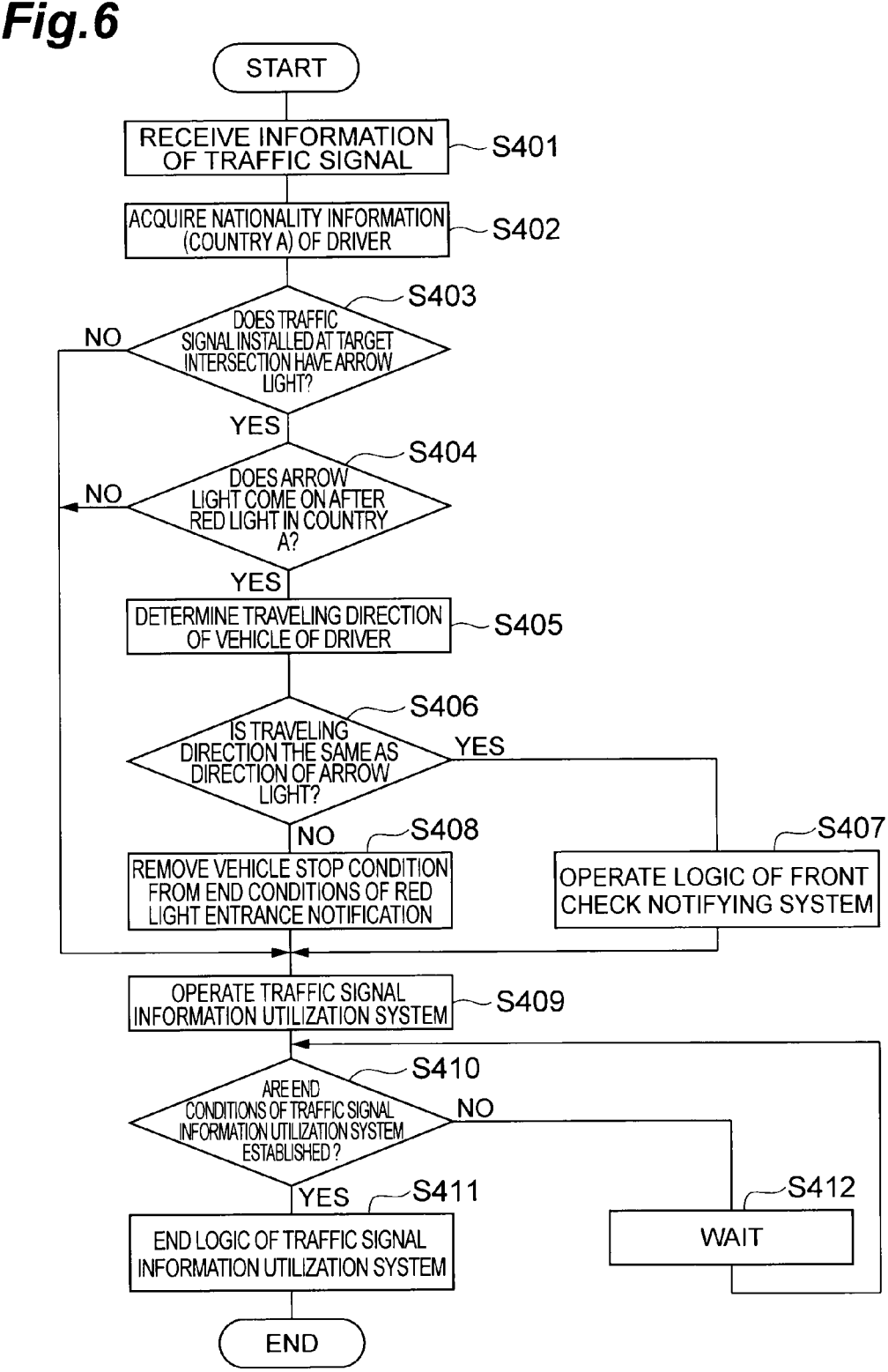
FIG. 6 is a flowchart diagram illustrating the operation of a drive supporting device according to a fourth embodiment.

In this embodiment, the drive supporting device 10a shown in FIG. 1 may be applied. As shown in FIG. 6, similarly to the first embodiment, the ECU 26 receives the traffic signal information of the traffic signal at the intersection through which the host vehicle passes (S401). Similarly to the first embodiment, the ECU 26 acquires the nationality information of the driver, such as information indicating that the driver of the host vehicle is from a country A (S402).

The ECU 26 determines whether a traffic signal with an arrow light is installed at a target intersection on the basis of the traffic signal information acquired in Step S401 (S403). When the traffic signal with an arrow light is not installed (S403), the ECU 26 operates a traffic signal information utilization system, as will be described below (S409).

When the traffic signal with an arrow light is installed (S403), the ECU 26 determines whether the arrow light comes on after the red light in the country A (S404). The ECU 26 may determine whether the arrow light comes on after the red light in the country A with reference to the traffic signal information table of all the countries of the world stored in the storage device 28. Alternatively, the ECU 26 may receive the traffic signal information of all the countries of the world from the communication device 18 or a predetermined probe and determine whether the arrow light comes on after the red light in the country A. When the arrow light does not come on after the red light in the country A (S404), the ECU 26 operates the traffic signal information utilization system, as will be described below (S409).

When the arrow light comes on after the red light in the country A (S404), the ECU 26 determines the direction of the host vehicle driven by the driver (S415). The direction of the host vehicle driven by the driver may be determined by, for example, the route guidance of a navigation system, the operation of a direction indicator or a steering wheel by the driver, and the position of the lane of the host vehicle.

When the direction of the host vehicle driven by the driver is the same as the direction of the arrow light (S406), the ECU 26 operates the logic of a front check notifying system so as to prompt the driver to check the front using the display 22 and the speaker 24 (S407). On the other hand, the direction of the host vehicle driven by the driver is different from the direction of the arrow light (S406), the ECU 26 removes a vehicle stop condition from the end conditions of the red light entrance notification such that the red light entrance notification is performed after the vehicle is stopped (S408). In this case, the ECU 26 may change the lower limit of the distance to the stop line where the red light entrance notification is performed to zero, or it may perform the red light entrance notification again even though the red light entrance notification is performed once.

The ECU 26 operates the traffic signal information utilization system (S409) and provides traffic signal information using the display 22 and the speaker 24. When the end conditions of the traffic signal information utilization system are established (S410), the ECU 26 ends the logic of the traffic signal information utilization system (S411). When the end conditions of the traffic signal information utilization system are not established (S410), the ECU 26 waits (S412). The end conditions of the traffic signal information utilization system include, for example, a case in which the red light intrusion notification is performed once, a case in which the host vehicle gets out of the service area, and a case in which the red light time ends.

Figure 8:
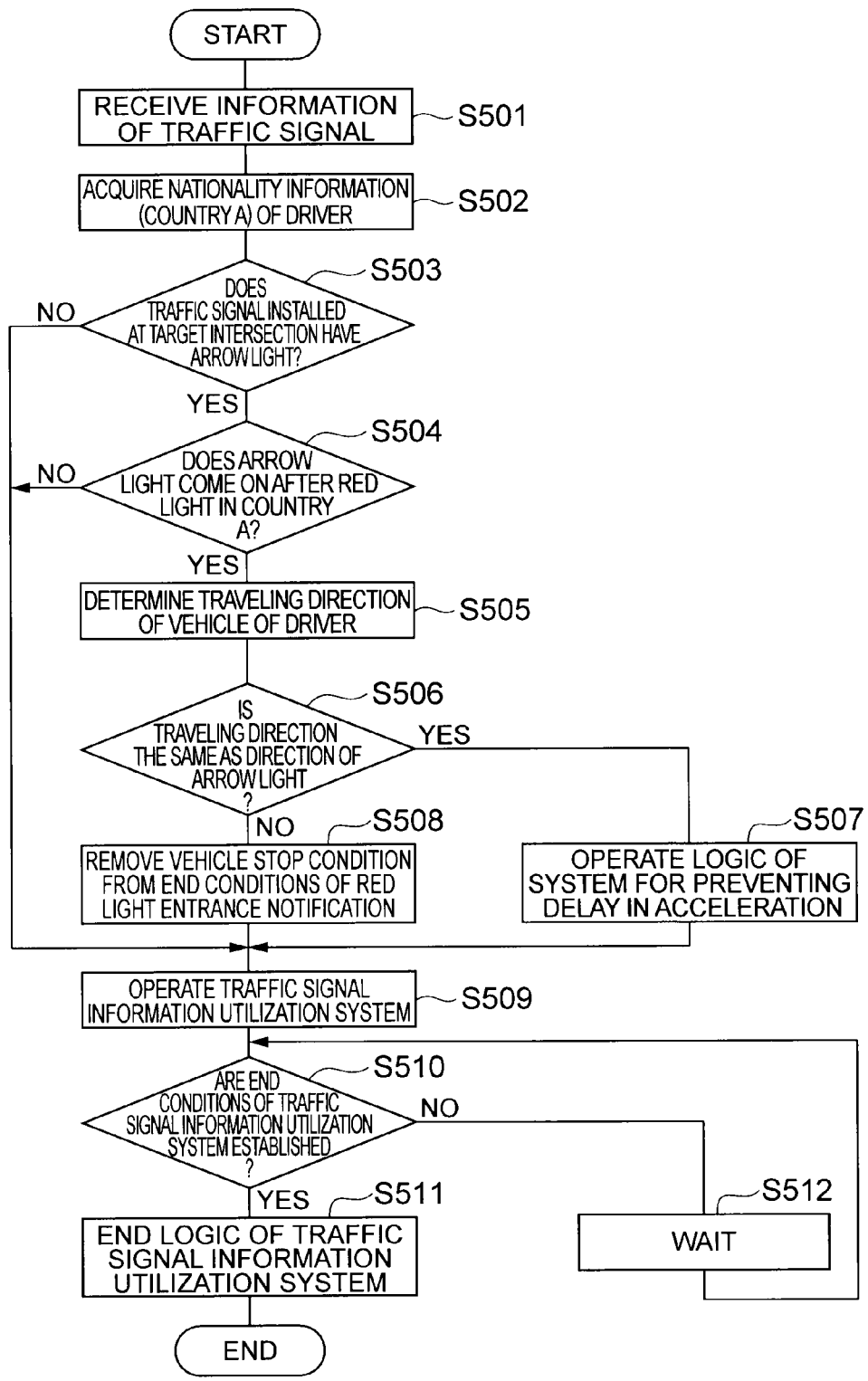
FIG. 8 is a flowchart diagram illustrating another operation of the drive supporting device according to the fourth embodiment.

Contrary to the above, when the driver from the country in which the arrow light comes on, followed by the red light, drives the vehicle in the country in which the arrow light comes on, followed by the green light, as shown in FIG. 8, the ECU 26 performs Steps S501 to S503, similarly to Steps S401 to S403. The ECU 26 determines whether the red light comes on after the arrow light comes on in the country A (S504). When the red light comes on after the arrow light comes on in the country A (S504), the ECU 26 performs Steps S504 to S506, similarly to Steps S404 to S406.

The ECU 26 operates a system for preventing a delay in acceleration (S507) for the driver who wants to drive the vehicle in the direction of the arrow light (S506). The ECU 26 may not end the red light entrance notifying system even after the host vehicle is stopped (S508) for the driver who wants to drive the vehicle in directions other than the direction of the arrow light (S506). The next Steps S509 to S512 may be the same as Steps S409 to S412.

In this embodiment, in the case in which there is an arrow light, even when the driver is in a strange place and the user is likely to understand that the conditions of the arrow light are the same as those in the place with which the driver is familiar, it is possible to effectively prevent the driver from misunderstanding the provided information.

That is, in this embodiment, the end condition of the red light entrance notification or the execution condition of the acceleration delay prevention system is changed considering the signal cycle of the traffic signal with an arrow light with which the driver is familiar. In the case in which the driver from the country in which the arrow light comes on, followed by the green light, drives the vehicle in the directions other than the direction of the arrow light, when the turning-on of the red light ends, the driver is likely to misunderstand that the arrow light comes on even though the green light comes on after the red light in practice, which results in a delay in acceleration. However, according to this embodiment, it is possible to prevent the delay in acceleration due to the misunderstanding of the driver. In addition, in the case in which the driver from the country in which the arrow light comes on, followed by the green light, drives the vehicle in the direction of the arrow light, when the turning-on of the red light ends, the driver is likely to misunderstand that the arrow light comes on even though the green light comes on after the red light in practice and the driver needs to check oncoming vehicles. As a result, the driver is likely to enter the intersection without sufficiently checking the surroundings. However, according to this embodiment, it is possible to prevent the vehicle from entering the intersection due to the misunderstanding of the driver. In this embodiment, the same process as described above may be performed for the opposite case.

Next, a fifth embodiment of the invention will be described. When the driver from the country in which the driver can turn right on a red light, for example, the USA drives the vehicle in the country in which the driver cannot turn right on a red light, for example, Japan, the driver is likely to misunderstand that the driver can turn right on a red light.

Therefore, in this embodiment, when the driver from the country in which the driver can turn right on a red light drives the vehicle in the right lane in the country in which the driver cannot turn right on a red light, the operation range of PCS control of the host vehicle is widened or the start timing of PCS control is reduced.

Figure 9:
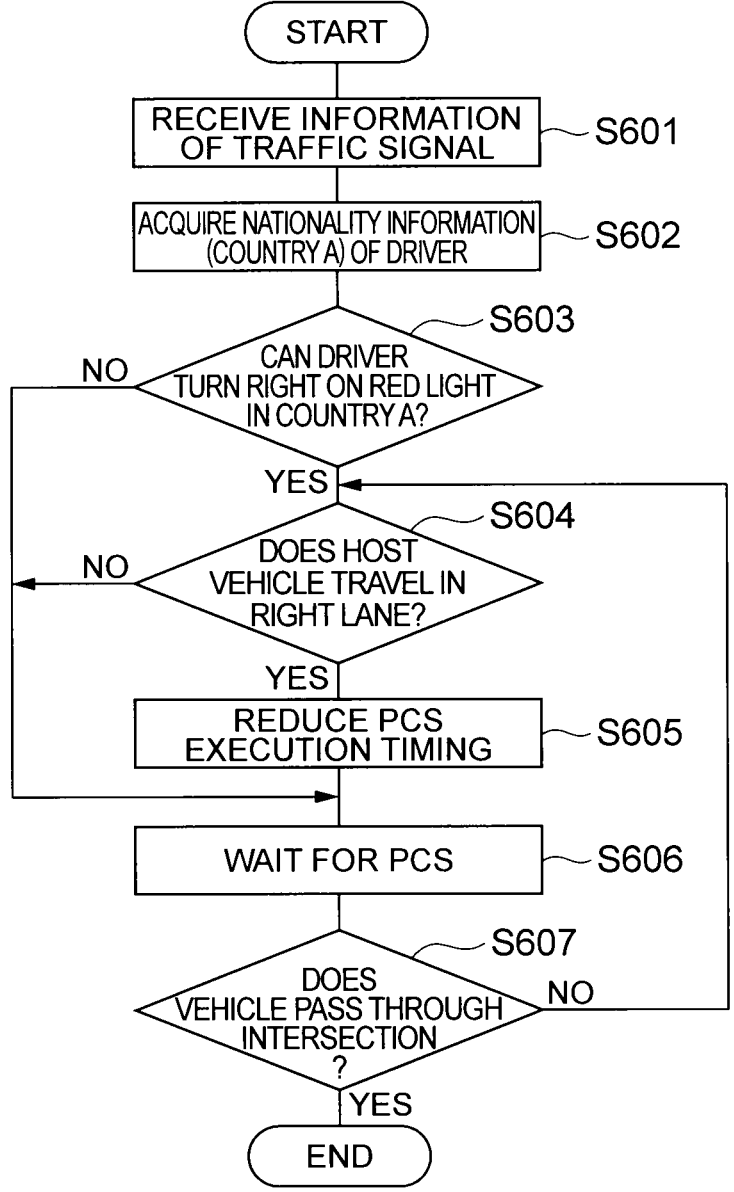
FIG. 9 is a flowchart diagram illustrating the operation of a drive supporting device according to a fifth embodiment.

In this embodiment, the drive supporting device 10b shown in FIG. 3 may be applied. As shown in FIG. 9, similarly to the first embodiment, the ECU 26 receives the traffic signal information of the traffic signal at the intersection through which the host vehicle passes (S601). Similarly to the first embodiment, the ECU 26 acquires the nationality information of the driver, such as information indicating that the driver of the host vehicle is from a country A (S602).

The ECU 26 determines whether the driver can turn right on a red light in the country A (S603). The ECU 26 may determine whether the driver can turn right on a red light in the country A with reference to the traffic signal information table of all the countries of the world stored in the storage device 28. Alternatively, the ECU 26 may receive the traffic signal information of all the countries of the world from the communication device 18 or a predetermined probe and determine whether the driver can turn right on a red light in the country A.

When it is determined that the driver can turn right on a red light in the country A (S603), the ECU 26 determines the lane of the host vehicle on the basis of the content of the route guidance performed by the GPS 12 or the navigation ECU 32 (S604). In this case, the ECU 26 may determine the lane of the host vehicle on the basis of, for example, the operation of a direction indicator or a steering wheel by the driver or the driving history of the driver.

When it is determined that the host vehicle travels in the right lane (S604), the ECU 26 reduces the operation timing of PCS control to be less than that under normal conditions (S605). In this case, the ECU 26 may set the operation range of PCS control to be more than that under normal conditions. The ECU 26 may change the operation timing or the operation range of PCS control as described above only at the intersection without an arrow light or the intersection where an arrow light does not come on.

Alternatively, the ECU 26 may notify other neighboring vehicles that the driver who is unfamiliar with this region drives the vehicle using the communication device 18 and set the distance between the host vehicle and other vehicles in ACC control to be more than that under normal conditions. In addition, the ECU 26 may notify the driver that the driver cannot turn right on a red light while providing the traffic signal information to the driver using the display 22 or the speaker 24.

Then, the ECU 26 waits for PCS control (S606). When the GPS 12 and the navigation ECU 32 detect that the host vehicle has passed through the intersection (S607), the ECU 26 ends the control operation.

In this embodiment, in particular, when the driver from the country in which the driver can turn right on a red light drives the vehicle in the right lane in the country in which the driver cannot turn right on a red light, the operation range of PCS control of the host vehicle is widened or the start timing of PCS control is reduced. Therefore, even when the driver from the country in which the driver can turn right on a red light drives the vehicle in the country in which the driver cannot turn right on a red light, it is possible to improve safety.

In this embodiment, the ECU 26 changes the aspect of providing information to the driver on the basis of the difference between the rules of driving for the on/off state of the traffic signal in the region in which the vehicle is currently located and the rules of driving for the on/off state of the traffic signal in the region in which the level of proficiency of the driver of the vehicle is higher than that in the region in which the vehicle is currently located. Therefore, even when the driver is in a strange place and is likely to analyze that the rules of driving for signals are the same as those in a familiar place, it is possible to effectively prevent the misunderstanding of the provided information.

Next, a sixth embodiment of the invention will be described. As described in the fifth embodiment, when the driver from the country in which the driver can turn right on a red light drives the vehicle in the country in which the driver cannot turn right on a red light, the driver is likely to misunderstand that the driver can turn right on a red light.

In this embodiment, even when the driver from the country in which the driver can turn right on a red light drives the vehicle in the country in which the driver cannot turn right on a red light, it is possible to prevent the driver from passing through the intersection on a red light by providing information to other vehicles.

Figure 10:
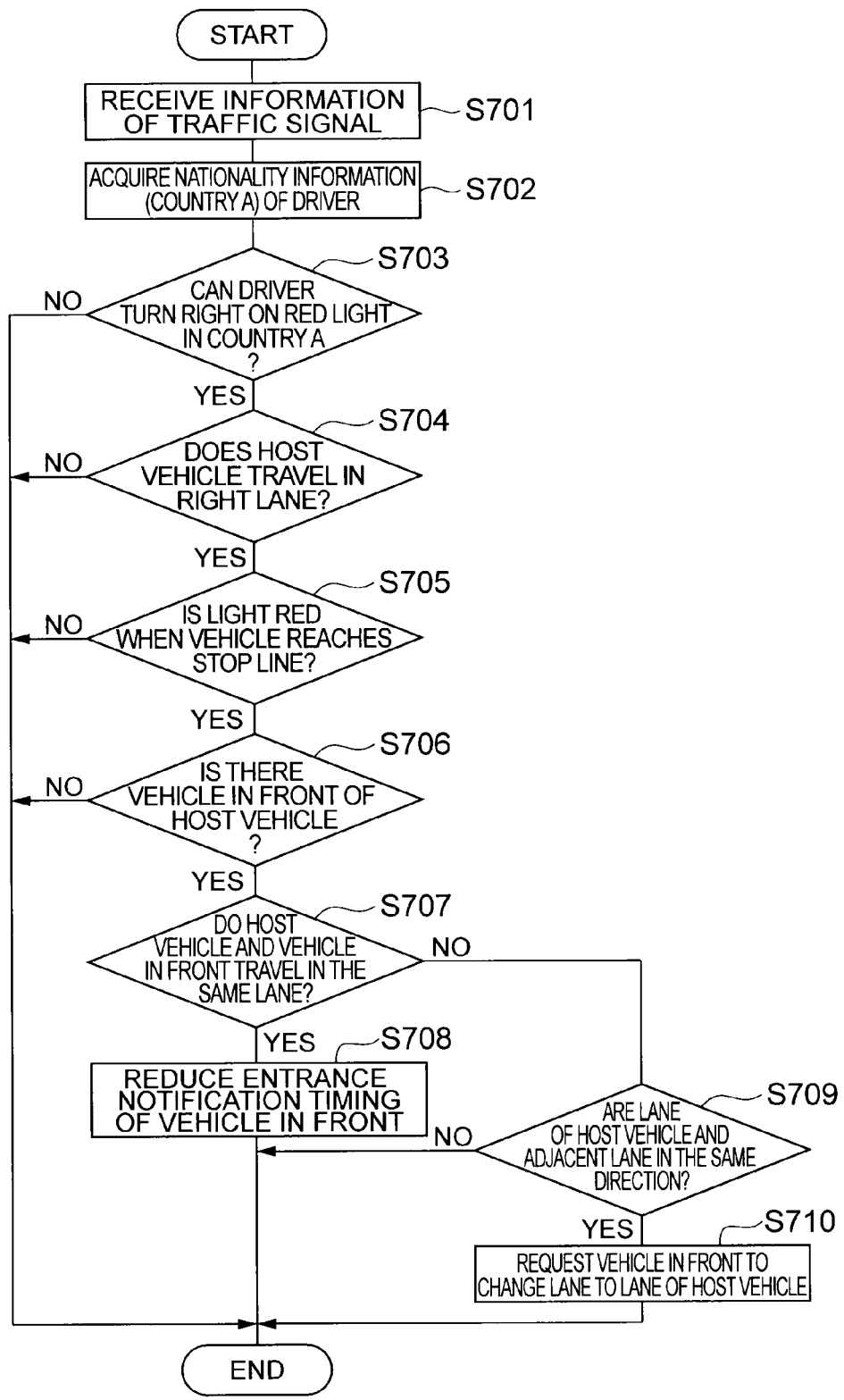
FIG. 10 is a flowchart diagram illustrating the operation of a drive supporting device according to a sixth embodiment.

In this embodiment, the drive supporting device 10a shown in FIG. 1 or the drive supporting device 10b shown in FIG. 3 may be applied. As shown in FIG. 10, similarly to the first embodiment, the ECU 26 receives the traffic signal information of the traffic signal at the intersection through which the host vehicle passes (S701). Similarly to the first embodiment, the ECU 26 acquires the nationality information of the driver, such as information indicating that the driver of the host vehicle is from a country A (S702).

Similarly to the fifth embodiment, the ECU 26 determines whether the driver can turn right on a red light in the country A (S703). When it is determined that the driver can turn right on a red light in the country A (S703), the ECU 26 determines the lane of the host vehicle on the basis of the content of the route guidance performed by the GPS 12 or the navigation ECU 32, similarly to the fifth embodiment (S704).

When it is determined that the host vehicle travels in the right lane (S704), the ECU 26 predicts whether the light will be red when the host vehicle reaches a stop line of the intersection on the basis of the traffic signal information received in Step S701 (S705). The ECU 26 may perform the above-mentioned process only at the intersection without an arrow light or the intersection where the arrow light does not come on.

When it is predicted that the light will be red when the host vehicle reaches the stop line of the intersection (S705), the ECU 26 determines whether there is another vehicle provided with the same drive supporting device 10a or 10b as that of the host vehicle in front of the host vehicle using the front camera 14, the millimeter-wave radar 16, or the communication device 18 (S706).

When it is determined that there is another vehicle in front of the host vehicle (S706), the ECU 26 determines whether the vehicle in front travels in the same lane as that in which the host vehicle travels using the front camera 14, the millimeter-wave radar 16, or the communication device 18 (S707). In this case, the ECU 26 may receive information from a sensor of a road-side facility through the communication device 18 and may determine whether the vehicle in front travels in the same lane as that in which the host vehicle travels.

When it is determined that the vehicle in front travels in the same lane as that in which the host vehicle travels, the ECU 26 transmits, to the vehicle in front, a request to reduce the notification timing of red light intrusion to the driver of the vehicle in front using the communication device 18 (S708). In addition, the ECU 26 may transmit, to the vehicle in front, a request to change or increase the time when the driver cannot pass through the intersection, which is to be notified to the driver of the vehicle in front, using the communication device 18. When the vehicle in front is completely stopped at a red light or when the vehicle in front completely passes through the intersection on a green light, the ECU 26 may stop the process of Step S708.

When it is determined that the vehicle in front does not travel in the same lane as that in which the host vehicle travels, the ECU 26 determines whether the lane in which the host vehicle travels and an adjacent lane are in the same direction using the front camera 14, the millimeter-wave radar 16, or the communication device 18 (S709).

Figure 11:
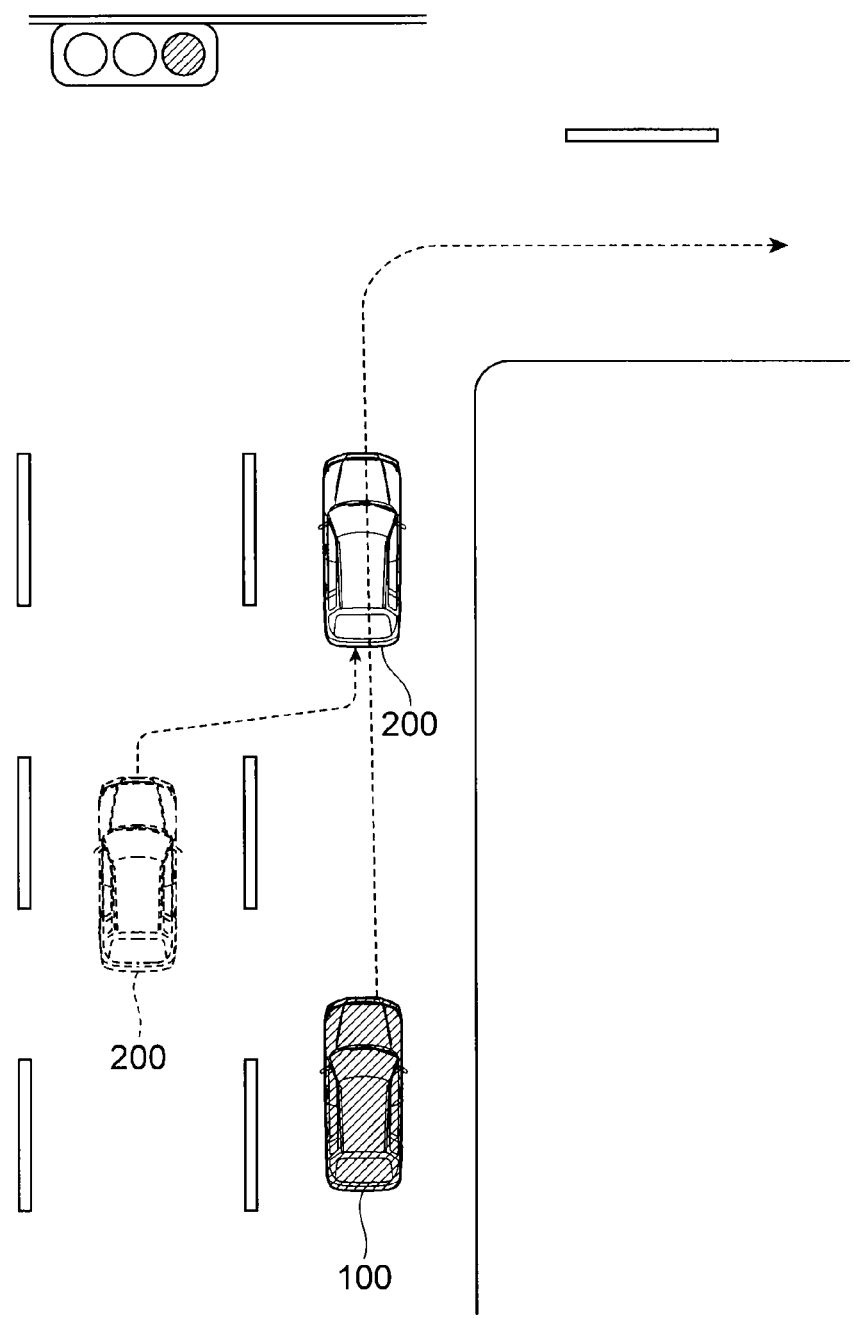
FIG. 11 is a plan view illustrating the operation conditions of the drive supporting device according to the sixth embodiment.

When it is determined that the lane in which the host vehicle travels and an adjacent lane are in the same direction (S709), the ECU 26 transmits, to a vehicle 200 in front of a host vehicle 100, a request to prompt the vehicle 200 to change its lane to the lane in which the host vehicle 100 travels using the communication device 18, as shown in FIG. 11 (S710). In addition, the ECU 26 may transmit, to the vehicle 200 in front, a request to prompt the driver of the vehicle 200 to change the route guidance by the navigation system or a notice of prompting the driver to perform automatic steering to change its lane to the lane in which the host vehicle travels. Alternatively, for example, the ECU 26 may perform automatic control to reduce the speed of the host vehicle 100 or increase the distance between the host vehicle and the vehicle 200 in front.

In Steps S708 to S710, the ECU 26 may notify other neighboring vehicles that there is a driver who is not accustomed to drive the vehicle in this region using the communication device 18.

In this embodiment, when the driver from the country in which the driver can turn right on a red light drives the vehicle in the country in which the driver cannot turn right on a red light and the host vehicle and a vehicle in front of the host vehicle travel in the same lane, the ECU 26 transmits, to the vehicle in front, a request to reduce the notification timing of red light intrusion to the driver of the vehicle in front or a request to change or increase the time when the driver cannot pass through the intersection, which is to be notified to the driver of the vehicle in front, using the communication device 18. Therefore, the vehicle in front is likely to be stopped at a red light. It is possible to prevent the driver of the host vehicle from misunderstanding that the driver can turn right even though the light is red and thus prevent the host vehicle from intruding into the intersection.

When the vehicle in front travels in a lane adjacent to the lane of the host vehicle, the ECU 26 transmits, to the vehicle in front, a request to prompt the vehicle in front to change its lane to the lane in which the host vehicle travels using the communication device 18. Therefore, it is possible to prevent the driver of the host vehicle from misunderstanding that the host vehicle can turn right even though the light is red due to the presence of another vehicle which travels in the same lane and thus prevent the host vehicle from intruding into the intersection.

Next, a seventh embodiment of the invention will be described. Contrary to the fifth and sixth embodiments, when the driver from the country in which the driver cannot turn right on a red light drives the vehicle in the country in which the driver can turn right on a red light, the driver is likely to misunderstand that the driver can enter the intersection and turn right on a red light even though the driver needs to be temporarily stopped at the intersection in practice.

Therefore, in this embodiment, when the driver from the country in which the driver cannot turn right on a red light drives the vehicle in the country in which the driver can turn right on a red light, temporary stop guidance indicating that the vehicle needs to be temporary stopped and temporary stop entrance notification indicating that, when the vehicle travels without being stopped, it is likely to enter the intersection where the vehicle needs to be temporarily stopped is performed, instead of performing red light guidance indicating that the light is red or the red light entrance notification.

Figure 12:
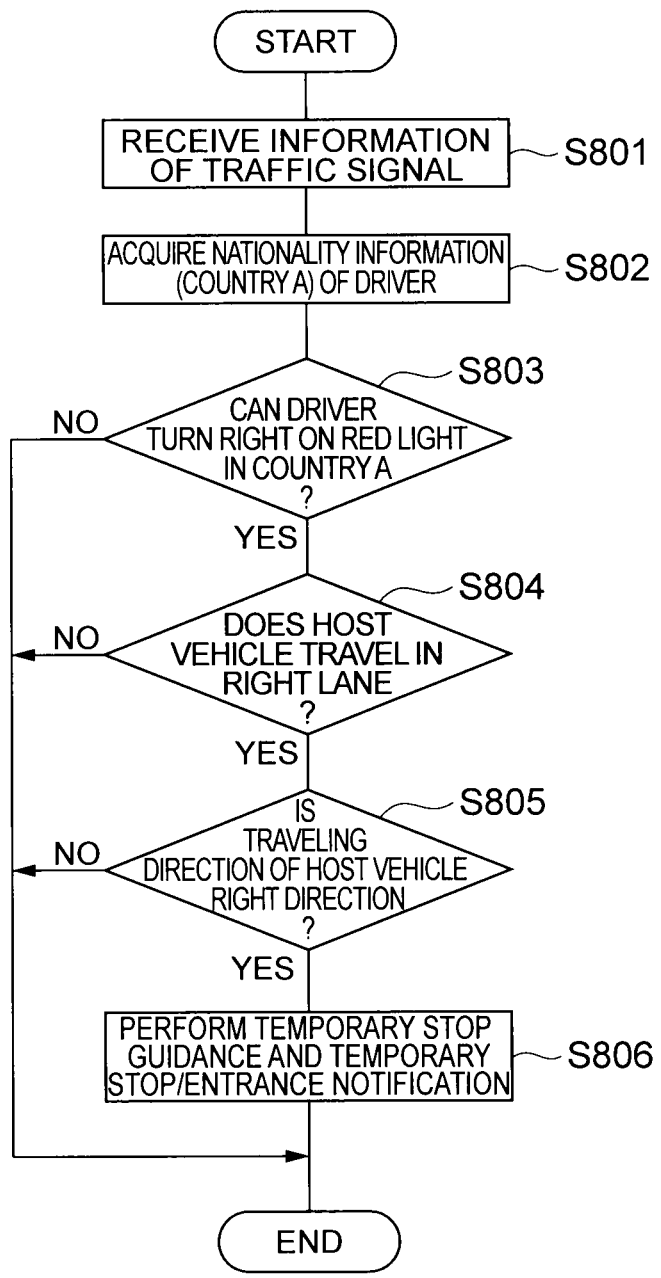
FIG. 12 is a flowchart diagram illustrating the operation of a drive supporting device according to a seventh embodiment.

In this embodiment, the drive supporting device 10a shown in FIG. 1 may be applied. As shown in FIG. 12, the ECU 26 performs Steps S801 to S804, similarly to Steps S701 to S704 in the sixth embodiment. However, in Step S803, the ECU 26 performs Steps S804 to S806 when the driver cannot turn right on a red light in the country A.

When it is determined that the host vehicle travels in the right lane (S804), the ECU 26 determines whether the traveling direction of the host vehicle is the right direction on the basis of the content of the route guidance performed by the GPS 12 or the navigation ECU 32 (S805). In this case, the ECU 26 may determine whether the traveling direction of the host vehicle is the right direction on the basis of the operation of the direction indicator or the steering wheel by the driver or the driving history of the driver.

When it is determined that the traveling direction of the host vehicle is the right direction (S805), the ECU 26 performs temporary stop guidance or temporary stop entrance notification using the display 22 or the speaker 24. In this case, the ECU 26 performs the notification process even when any signal light is displayed regardless of the color of the signal light. The ECU 26 performs the notification process even when the host vehicle crosses the stop line. The reason is as follows. In the case of temporary stop, even when the driver considers the temporary stop, the level of consciousness for stopping before the stop line is low. The ECU 26 sets the lower limit of the vehicle speed at which the notification is performed to a small value. The reason is as follows. In the case of temporary stop, in many cases, the driver goes through the stop line at a low speed even though the driver recognizes the temporary stop.

This embodiment can be achieved only by static information, such as the information of the navigation system in the country in which the driver can turn right on a red light. That is, as described above, even when it is difficult to acquire traffic signal information, such as a signal cycle, from the road-side facilities, the ECU 26 can perform, for example, the temporary stop guidance when the traveling direction of the host vehicle is the right direction. Alternatively, when the traveling direction of the host vehicle is determined to be the right direction in advance, the road-side facilities may not transmit the traffic signal information, such as the signal cycle. In this way, it is possible to prevent a delay in the data of the road-side facilities.

In this embodiment, the ECU 26 changes the aspect of providing information to the driver on the basis of the difference between the rules of driving for the on/off state of the traffic signal in the region in which the vehicle is currently located and the rules of driving for the on/off state of the traffic signal in the region in which the level of proficiency of the driver of the vehicle is higher than that in the region in which the vehicle is currently located. Therefore, even when the driver is in a strange place and is likely to analyze that the rules of driving for signals are the same as those in a familiar place, it is possible to effectively prevent the misunderstanding of the provided information.

In particular, in this embodiment, when the driver from the country in which the driver cannot turn right on a red light drives the vehicle in the country in which the driver can turn right on a red light, the ECU 26 performs temporary stop guidance or temporary stop entrance notification. Therefore, when the driver from the country in which the driver cannot turn right on a red light drives the vehicle in the country in which the driver can turn right on a red light, it is possible to prevent the driver from misunderstanding that the driver can enter the intersection and turn right on a red light even though the driver needs to temporarily stop at the intersection in practice.

Figure 14:
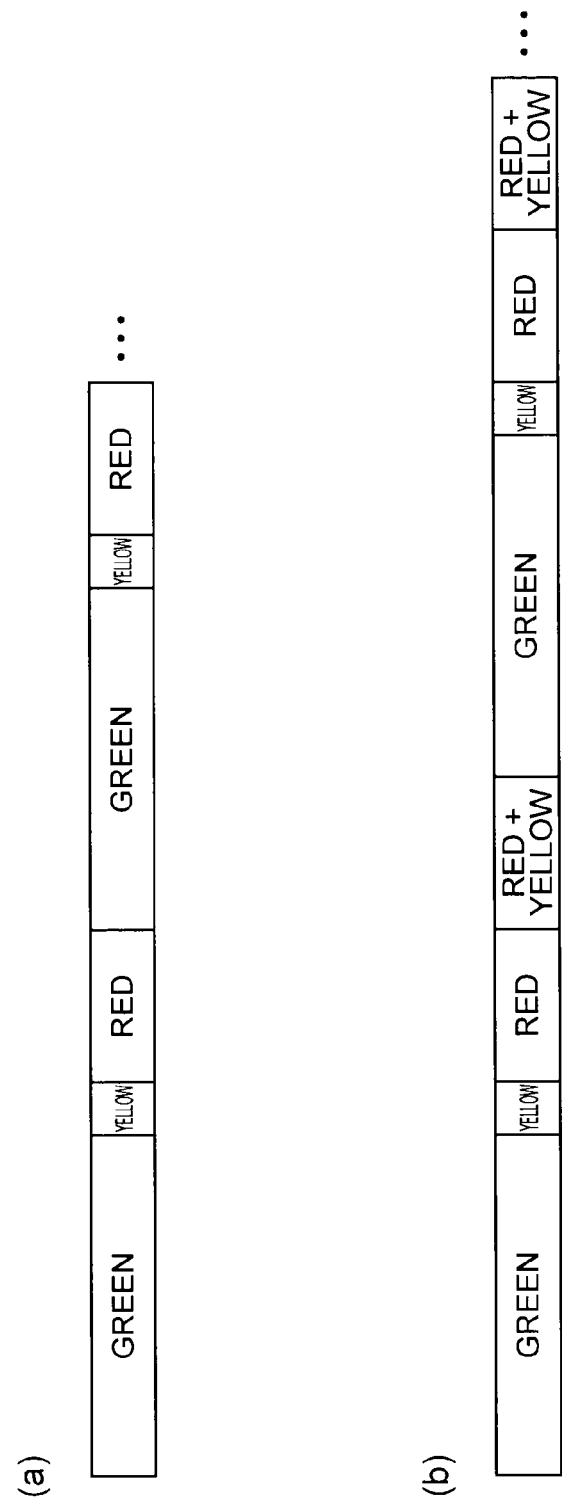
FIGS. 14(a) and 14(b) are diagrams illustrating a signal cycle in which a red light comes on, followed by a green light and a signal cycle in which a red light comes on, followed by a red+yellow light.

Next, an eighth embodiment of the invention will be described. When the driver from the country in which a red light and a yellow light (hereinafter, referred to as red+yellow or a red+yellow light) come on at the same time before the light turns from red to green as shown in FIG. 14 (b), for example, Europe drives the vehicle in the country in which the red light comes on, followed by the green light as shown in FIG. 14(a), for example, Japan, the driver from Europe is likely to misunderstand that it is not yet time to accelerate the vehicle even though the red light turns off.

On the contrary, when the driver from the country in which the red light comes on, followed by the green light drives the vehicle in the country in which the red+green light comes on before the light turns from red to green, the driver from the country in which the red light comes on, followed by the green light misunderstands that the green light comes on after the red light and is likely to enter the intersection on the red+yellow light.

Therefore, in this embodiment, when the driver from the country in which the red light comes on, followed by the red+yellow light drives the vehicle in the country in which the red light comes on, followed by the green light, the ECU 26 operates the logic of an acceleration delay prevention system.

Figure 13:
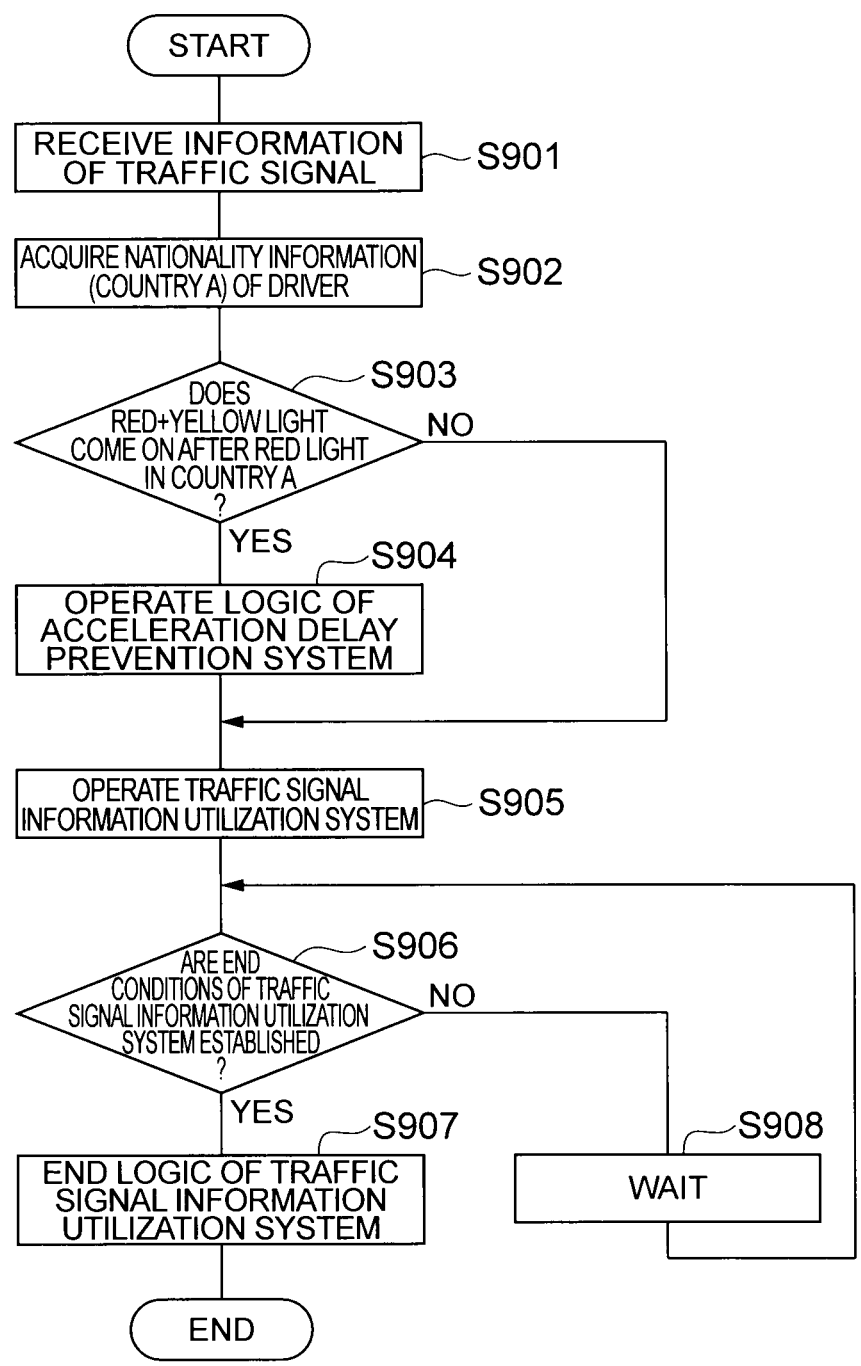
FIG. 13 is a flowchart diagram illustrating the operation of a drive supporting device according to an eighth embodiment.

In this embodiment, the drive supporting device 10a shown in FIG. 1 may be applied. As shown in FIG. 13, similarly to the first embodiment, the ECU 26 receives the traffic signal information of the traffic signal at the intersection through which the host vehicle passes (S901). Similarly to the first embodiment, the ECU 26 acquires the nationality information of the driver, such as information indicating that the driver of the host vehicle is from a country A (S902).

The ECU 26 determines whether the red+yellow light comes on after the red light in the country A (S903). The ECU 26 may determine whether the red+yellow light comes on after the red light in the country A with reference to the traffic signal information table of all the countries of the world stored in the storage device 28. Alternatively, the ECU 26 may receive the traffic signal information of all the countries of the world using the communication device 18 or a predetermined probe and determine whether the red+yellow light comes on after the red light in the country A.

When it is determined that the red+yellow light comes on after the red light in the country A (S903), the ECU 26 operates the logic of the acceleration delay prevention system and notifies the driver that the green light comes on after the red light using the display 22 or the speaker 24 (S904).

The ECU 26 performs Steps S905 to S908, similarly to Steps S409 to S411 in the fourth embodiment. Contrary to the above, when the driver from the country in which the red light comes on, followed by the green light drives the vehicle in the country in which the red light comes on, followed by the red+green light, the ECU 26 determines whether the driver is from the country in which the red light comes on, followed by the green light in Step S903 and notifies red light entrance notification even after the vehicle is stopped in Step S904.

In this embodiment, when the driver from the country in which the red light comes on, followed by the red+green light drives the vehicle in the country in which the red light comes on, followed by the green light, the ECU 26 operates the logic of the acceleration delay prevention system. Therefore, it is possible to prevent the driver from misunderstanding that it is not yet time to accelerate the vehicle even though the red light turns off.

In this embodiment, when the driver from the country in which the red light comes on, followed by the green light drives the vehicle in the country in which the red light comes on, followed by the red+yellow light, the ECU 26 performs the red light entrance notification even after the vehicle is stopped. Therefore, it is possible to prevent the driver from misunderstanding that the green light comes on after the red light and entering the intersection on the red+yellow light.

Next, a ninth embodiment of the invention will be described. In a case in which the driver from the country in which road freezing rarely occurs drives the vehicle in the country in which road freezing frequently occurs, when the driver stops the vehicle as in the driver's own country, there is a possibility that the driver will not stop the vehicle. Therefore, in this embodiment, the ECU 26 increases the amount of brake control and reduces the notification timing of red light entrance for the driver who is unfamiliar with road freezing.

Figure 15:
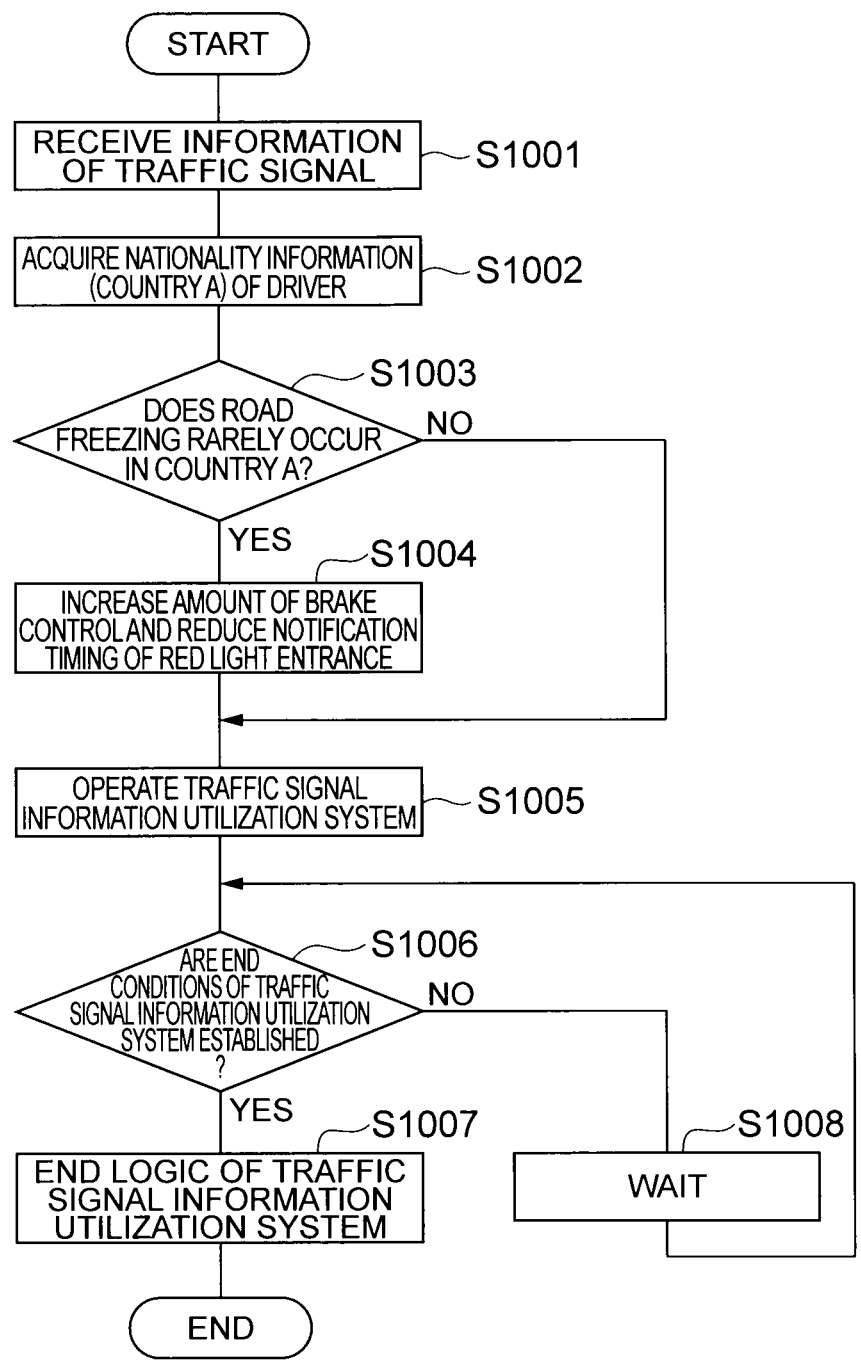
FIG. 15 is a flowchart diagram illustrating the operation of a drive supporting device according to a ninth embodiment.

The drive supporting device 10b shown in FIG. 3 may be applied. As shown in FIG. 15, similarly to the first embodiment, the ECU 26 receives the traffic signal information of the traffic signal at the intersection through which the host vehicle passes (S1001). Similarly to the first embodiment, the ECU 26 acquires the nationality information of the driver, such as information indicating that the driver of the host vehicle is from a country A (S1002).

The ECU 26 determines whether road freezing rarely occurs in the country A (S1003). The ECU 26 may determine whether road freezing rarely occurs in the country A with reference to a weather information table of all the countries of the world stored in the storage device 28. Alternatively, the ECU 26 may receive the weather information of all the countries of the world using the communication device 18 or a predetermined probe and determine whether road freezing rarely occurs in the country A.

When it is determined that road freezing rarely occurs in the country A (S1003), the ECU 26 increases the amount of brake control by the brake actuator 38 and reduces the notification timing of red light intrusion by the display 22 or the speaker 24 (S1004). The ECU 26 performs Steps S1005 to S1008, similarly to Steps S409 to S411 in the fourth embodiment.

In this embodiment, the ECU 26 increases the amount of brake control and reduces the notification timing of red light entrance for the driver who is unfamiliar with road freezing. Therefore, it is possible to prevent the problem that it is difficult to stop the vehicle driven by the driver who is unfamiliar with road freezing at the intersection on the red light.

The embodiments of the invention have been described above, but the invention is not limited to the above-described embodiments. Various modifications of the invention can be made.

INDUSTRIAL APPLICABILITY

The invention can provide a drive supporting device capable of appropriately performing drive support for the driver even when the driver is in a strange place.

REFERENCE SIGNS LIST 10a, 10b: DRIVE SUPPORTING DEVICE
12: GPS
14: FRONT CAMERA
16: MILLIMETER-WAVE RADAR
18: COMMUNICATION DEVICE
20: VEHICLE SPEED SENSOR
22: DISPLAY
24: SPEAKER
26: ECU
28: STORAGE DEVICE
30: MAP INFORMATION DB
32: NAVIGATION ECU
34: ACC SWITCH
36: PCS SWITCH
38: BRAKE ACTUATOR
40: ACCELERATOR ACTUATOR
100: HOST VEHICLE
200: ANOTHER VEHICLE

The invention claimed is:

1. A drive supporting device comprising:
an information acquiring unit that acquires traffic signal information related to a time-series on/off state of a traffic signal; and
a drive support unit that supports the driving of a vehicle on the basis of the traffic signal information acquired by the information acquiring unit,
wherein the drive support unit changes the aspect of providing a provision information generated on the basis of the traffic signal information to a driver, on the basis of a difference between the rules governing the traffic signal information in the region in which the vehicle is currently located and the rules governing the traffic signal information in a region in which the driver of the vehicle has nationality.

2. The drive supporting device according to claim 1,
wherein the drive support unit changes the aspect of providing the provision information to the driver, on the basis of a difference between the rules of driving for the on/off state of the traffic signal in the region in which the vehicle is currently located and the rules of driving for the on/off state of the traffic signal in the region in which the driver of the vehicle has nationality.

3. The drive supporting device according to claim 1,
wherein the drive support unit changes the aspect of providing the provision information to the driver, on the basis of a direction indicated by an arrow light and a direction in which the vehicle travels.

4. The drive supporting device according to claim 1,
wherein the drive support unit controls the traveling of the vehicle on the basis of the traffic signal information acquired by the information acquiring unit, and changes an aspect of controlling the traveling of the vehicle on the basis of the difference between the rules governing driving in the region in which the vehicle is currently located and the rules governing driving in the region in which the driver of the vehicle has nationality.

5. The drive supporting device according to claim 4,
wherein the drive support unit changes a control target range of the traveling of the vehicle on the basis of the difference between the rules governing driving in the region in which the vehicle is currently located and the rules governing driving in the region in which the driver of the vehicle has nationality.

6. The drive supporting device according to claim 4,
wherein the drive support unit changes the control timing of the traveling of the vehicle on the basis of the difference between the rules governing driving in the region in which the vehicle is currently located and the rules governing driving in the region in which the driver of the vehicle has nationality.

7. A drive supporting device comprising:
an information acquiring unit that acquires traffic signal information related to a time-series on/off state of a traffic signal;
a drive support unit that supports the driving of a vehicle on the basis of the traffic signal information acquired by the information acquiring unit; and
a proficiency level determining unit that determines the level of proficiency of a driver of the vehicle in the region in which the vehicle is currently located,
wherein the proficiency level determining unit determines the level of proficiency of the driver of the vehicle in the region in which the vehicle is currently located on the basis of at least one of a driving time and a driving distance at a previous address of the driver and at least one of a driving time and a driving distance in the region in which the vehicle is currently located, and
wherein the drive support unit changes a driver support aspect on the basis of the level of proficiency of the driver of the vehicle in a region in which the vehicle is currently located.

8. The drive supporting device according to claim 7,
wherein the drive support unit changes an aspect of providing the driver with provision information which is created on the basis of the traffic signal information acquired by the information acquiring unit, on the basis of the level of proficiency of the driver of the vehicle in the region in which the vehicle is currently located.

9. The drive supporting device according to claim 8,
wherein the drive support unit changes the aspect of providing the provision information to the driver, on the basis of a difference between the traffic signal information in the region in which the vehicle is currently located and the traffic signal information in a region in which the level of proficiency of the driver of the vehicle is higher than that in the region in which the vehicle is currently located.

10. The drive supporting device according to claim 8,
wherein the drive support unit changes the aspect of providing the provision information to the driver, on the basis of a difference between the rules of driving for the on/off state of the traffic signal in the region in which the vehicle is currently located and the rules of driving for the on/off state of the traffic signal in the region in which the level of proficiency of the driver of the vehicle is higher than that in the region in which the vehicle is currently located.

11. The drive supporting device according to claim 8,
wherein the drive support unit changes the aspect of providing the provision information to the driver, on the basis of a direction indicated by an arrow light and a direction in which the vehicle travels.

12. The drive supporting device according to claim 7,
wherein the drive support unit controls the traveling of the vehicle on the basis of the traffic signal information acquired by the information acquiring unit, and changes an aspect of controlling the traveling of the vehicle on the basis of the level of proficiency of the driver of the vehicle in the region in which the vehicle is currently located.

13. The drive supporting device according to claim 12,
wherein the drive support unit changes a control target range of the traveling of the vehicle on the basis of the level of proficiency of the driver of the vehicle in the region in which the vehicle is currently located.

14. The drive supporting device according to claim 12,
wherein the drive support unit changes the control timing of the traveling of the vehicle on the basis of the level of proficiency of the driver of the vehicle in the region in which the vehicle is currently located.

* * * * *